United States Patent

Schoo et al.

Patent Number: 6,009,101
Date of Patent: Dec. 28, 1999

[54] COMMUNICATION ACCESS SYSTEM WITH DISTRIBUTED PROCESSING

[75] Inventors: Daniel L. Schoo, Island Lake; Richard J. Varman, Deer Park, both of Ill.

[73] Assignee: 3Com Corporation, Santa Clara, Calif.

[21] Appl. No.: 09/036,462

[22] Filed: Mar. 6, 1998

[51] Int. Cl.$^6$ ........................................... H04J 3/02
[52] U.S. Cl. ............................. 370/400; 370/401
[58] Field of Search ........................ 370/400, 401, 370/402, 403, 395, 389, 352, 351, 353, 464, 465, 466, 468, 442; 375/200; 709/103, 104, 201, 203, 207, 212, 213, 217, 219, 220, 304, 302, 250

[56] References Cited

U.S. PATENT DOCUMENTS

| | | | |
|---|---|---|---|
| 5,822,306 | 10/1998 | Catchpole | 370/401 |
| 5,872,779 | 2/1999 | Vaudreuil | 370/401 |

Primary Examiner—Dang Ton
Attorney, Agent, or Firm—McDonnell Boehnen Hulbert & Berghoff

[57] ABSTRACT

A method and apparatus for distributing protocol processing among a plurality of computing platforms. Data communications equipment such as Remote Access Devices, Communication Servers, Terminal Servers, and Dial-up Routers provide single user or large-scale multiple user communication access to various computing environments. The equipment costs and performance of levels of providing such access equipment is related to the amount of CPU processing capability and memory required to support the desired number of serial communication links. It is common to use protocols that terminate in their entirely in the same processing machine. This invention encompasses methods developed to increase the cost/performance capabilities of the communication equipment that supports these serial links, primarily by means of distributing the protocol processing across multiple computing platforms, including devices such as modems.

4 Claims, 11 Drawing Sheets

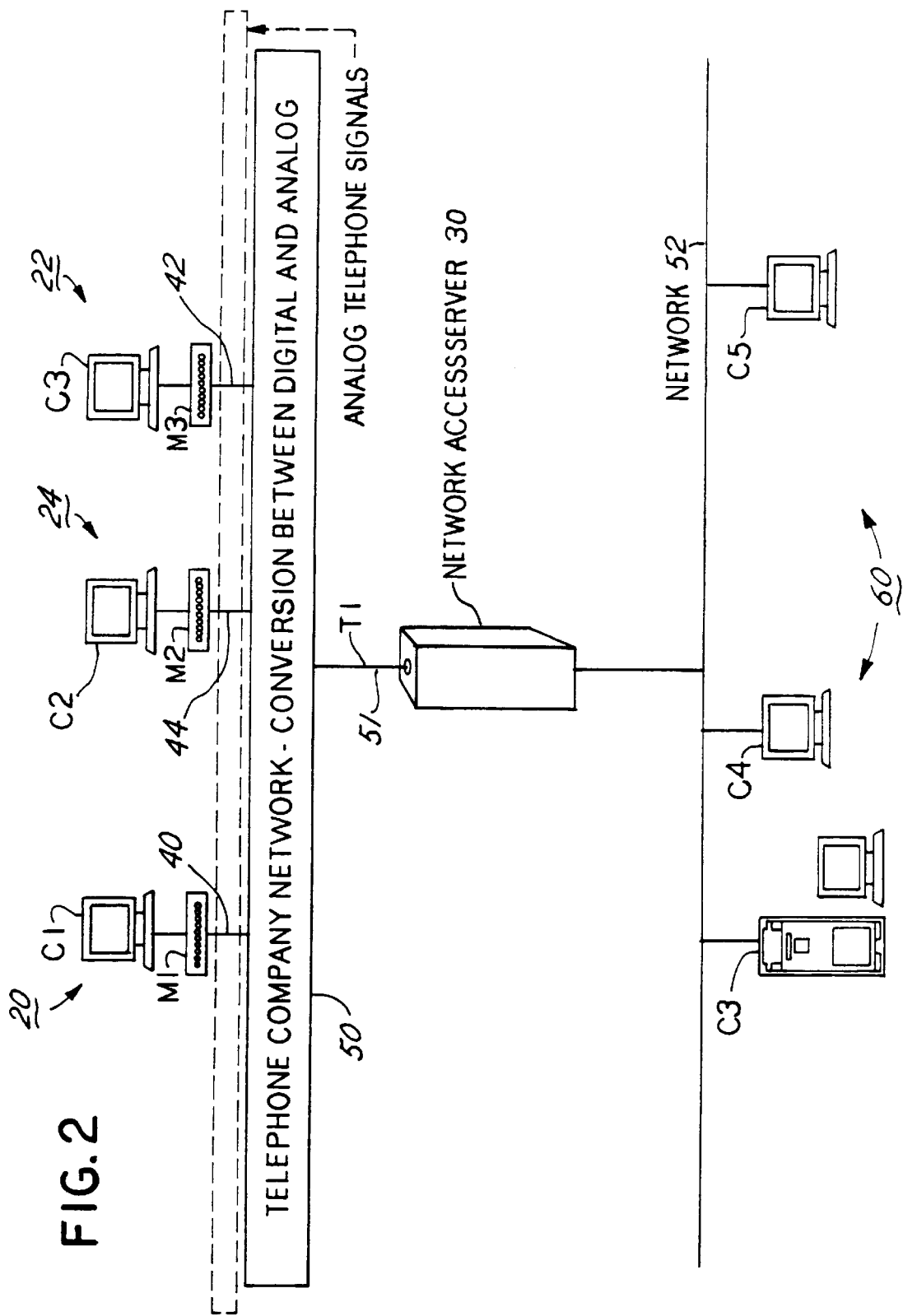

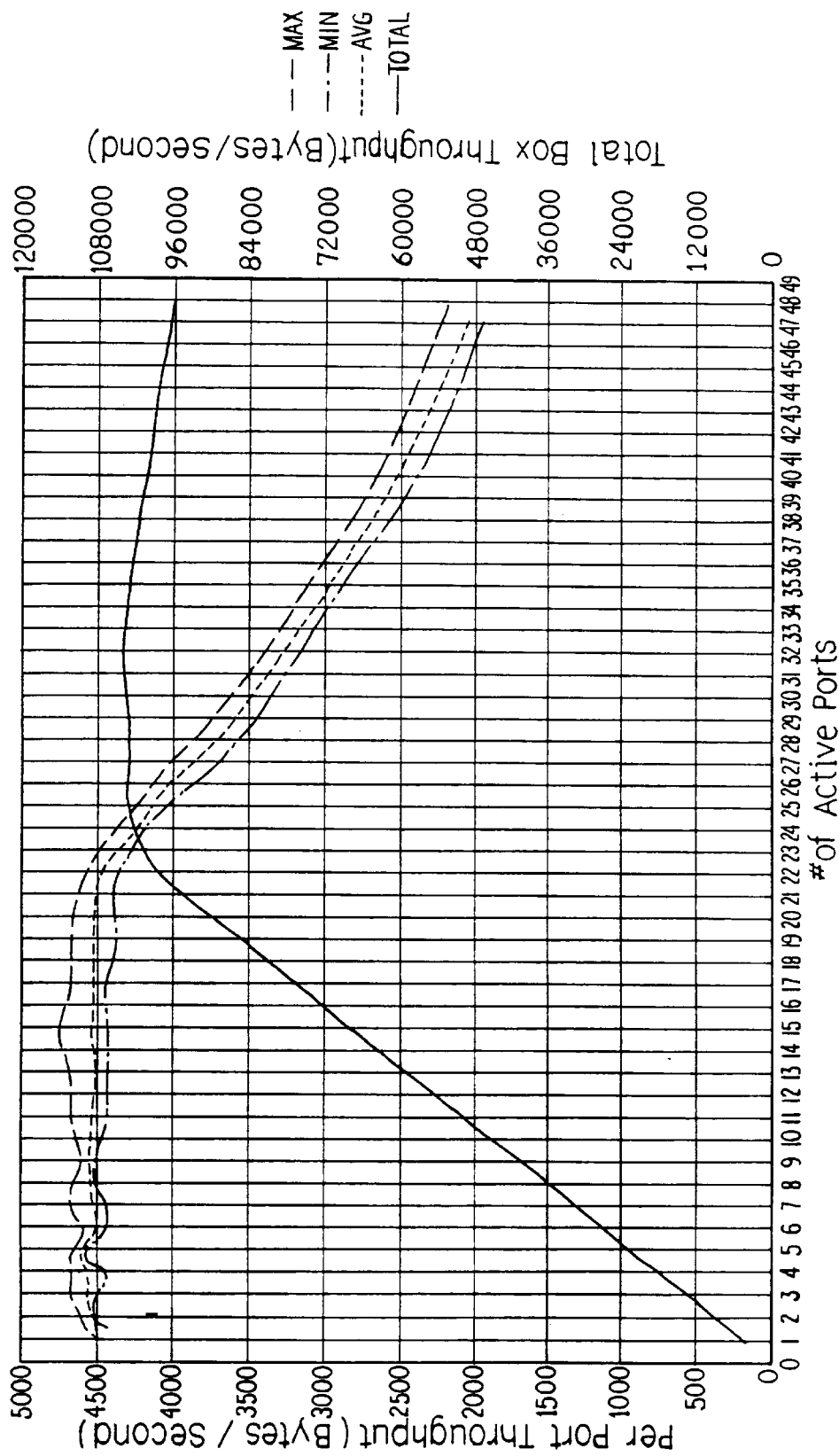

COMMUNICATION ACCESS SYSTEM WITH DISTRIBUTED PROCESSING

NOTICE RE: COPYRIGHT

A portion of the disclosure of this patent document contains matter subject to copyright protection. The copyright owner has no objection to the facsimile reproduction by anyone of the patent disclosure, as it appears in the Patent and Trademark Office files and records, but otherwise retains all copyright rights whatsoever.

BACKGROUND OF THE INVENTION

This invention relates generally to the fields of telecommunications and the processes by which telephone calls are switched into and out of a computer system from a telephone line or other communications link. The invention is particularly suitable for use in an environment in which a high volume of calls are routed into or out of the computer system at the same time.

The methods disclosed herein can be performed by an element of communications equipment we have called a "network access server." The network access server is a device that receives incoming calls and routes them to a computer system via a network, or that receives calls from the network and routes them onto a communications link. In our distributed processing invention, a dramatic increase in the efficiency of the call routing process is achieved, thereby maximizing call throughput and minimizing the overall call connect time. This result is achieved by distributing computationally intensive protocol processing (such as Point-to-Point Protocol or PPP processing) among multiple computing platforms such as the modems of the network access server. Heretofore, the protocol processing has been performed in a single computing platform at the network interface.

Various types of communication devices are placed at the interface between a modem and a computer network, such as routers, terminal servers, and modules sometimes referred to as "gateway cards". These devices implement software programs that control the inflow and outflow of calls between the modems and the network. One layer of the software hierarchy that is run in these devices is known in the art as an "application layer". This document makes frequent reference to the terms "application", "application layer" and "application software layer". As used herein, these terms mean a communication control and management software layer above the protocol stacks in a communication device, the device typically placed at the gateway (or interface) between a modem and a computer network.

State of the art modems, such as the V.34 Quad Modem developed by U.S. Robotics Corp., of Skokie, Ill., the assignee of the present invention, have a feature whereby two protocols are implemented in the modem. The first protocol is a modified version of an asynchronous High-level Data Link Control (HDLC) framing of Point-to-Point Protocol (PPP). The protocol could be synchronous HDLC framing of PPP in other implementations. The modem performs the flag sequence, data transparency, and Frame Check Sequence (FCS) on each PPP frame. The second protocol performed in the modem is Serial Line Internet Protocol (SLIP).

In the prior art, when an application software routine at the network access server gateway creates a PPP (or SLIP) frame, it checks each byte, looking for a byte that is a control character. If the application finds a control character, a PPP Escape character (or SLIP Escape character) is stuffed into the data stream. Then, the original control character is translated to a transparent character and stuffed into the data stream. This usually requires two buffers, because extra characters are added. For PPP frames, while the application is looking at each byte of the frame, it must also calculate the FCS. When the application receives a PPP (or SLIP) frame, it must do the reverse of the above process. In some network access servers, such as the U.S. Robotics NETServer, up to 60 modems may be active at any one time. This means that the gateway computing platform in the network access server would be doing this process for each of the 60 modems if the prior art technique was used. This results in a extremely heavy processing load on one computing platform, and introduces latencies and delays in the call routing process. These effects combine to significantly reduce call throughput, particularly where a large volume of calls are simultaneously received or transmitted through the network access server.

One prior art approach to increasing call throughput has been to incorporate communications controller hardware, such as the Cirrus Logic CL-CD 2430/CD 2431 device, into the protocol processing circuitry. The present invention eliminates the need for such expensive hardware devices, by enabling the performance of the protocol processing within existing computing platforms, such as the processors in the modems associated with the network access server.

SUMMARY OF THE INVENTION

The present invention is a method for routing incoming or outgoing calls into or out of a computer system. For incoming calls, the method comprises the steps of receiving the incoming calls and routing the calls to a plurality of modems, distributing the processing of protocols for the incoming calls among multiple computing platforms, processing the protocols for the incoming calls, and subsequently routing the incoming calls to the computer system over a network. For outgoing calls, the calls are routed from the network to a plurality of modems in the network access server, distributing the protocol processing among a plurality of computing platforms, and sending the calls out to a communications link such as a T1 telephone line.

In one preferred embodiment of the invention, the method is performed in a network access server having a plurality of modems for receiving a plurality of incoming calls or modulating a plurality of calls onto a communications link. The computing platforms comprise the data processing structures in each modem.

Another aspect of the invention is a method for routing calls into a computer system via a modem, comprising the steps of receiving the incoming call at the modem, performing the processing of protocols for the incoming calls in a computing platform in the modem, and routing the incoming calls to the computer system. In this embodiment, the use of the modem as the computing platform for the protocol processing relieves the computing platform at the interface between the modem and the computer system (such as the computing platform in the router) of the protocol processing burden, and reduces latency in the call routing process, reducing the overall call connect time.

BRIEF DESCRIPTION OF THE DRAWINGS

Presently preferred embodiments of the invention are depicted in the drawings, wherein like reference numerals refer to like elements in the various views, and wherein:

FIG. 2 is an illustration of the overall communications system in which an alternative form of the invention is implemented, illustrating the relationship between various call originators, a telephone network, a network access server, and a host computer system linked to the network access server via a network;

FIG. 11 is a graph of the download throughput when the distributed processing technique according to the teachings of the present invention is used.

DETAILED DESCRIPTION OF THE PREFERRED EMBODIMENT

I. General Discussion

Figure 1A:
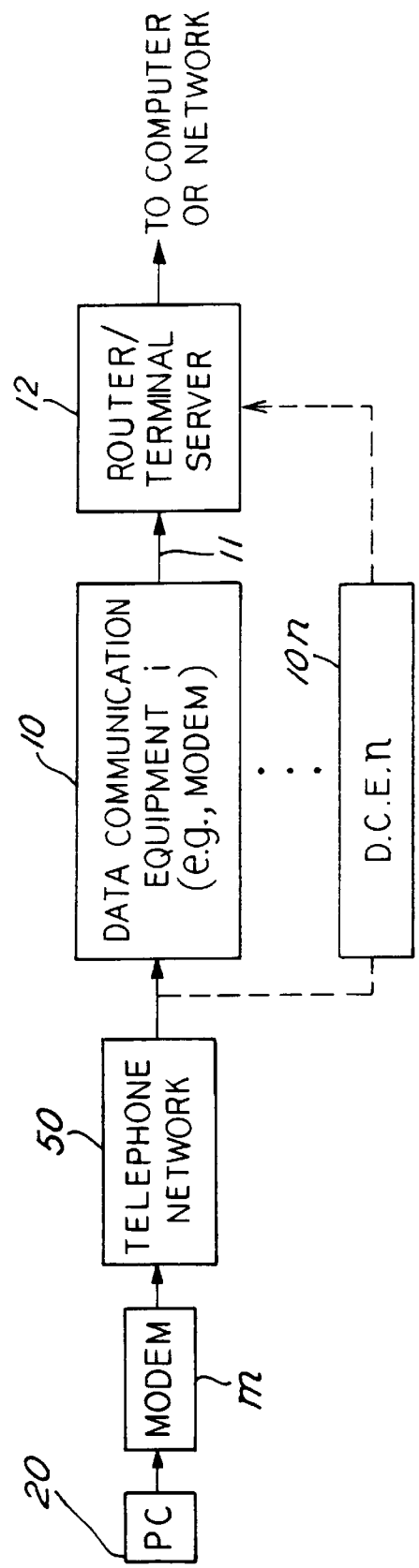
FIG. 1A is a block diagram illustrating one form in which the invention may be implemented.

Referring to FIG. 1A, the invention may be implemented in a communications system in which a call originates from a computer, such as a PC 20, which sends data via a Data Communications Equipment (DCE) (such as modem M) onto telephone network 50 or other communications link to a receiving DCE 10, such as a modem. The call originating data terminal 20 has communication software that uses a communications protocol, such as PPP or SLIP. The DCE 10 demodulates the call from the personal computer 20 and passes it over a transmission means 11 for example an RS 232 cable or packet bus, to a router or terminal server 12. The router or terminal server 12 passes the call onto a network or host computer system, for example a personal computer (not shown in FIG. 1A). Up to n DCE's 10 may be provided, depending on the amount of expected incoming traffic. Or, for some applications, only a single DCE or modem 10 may be required. The DCE 10 and router 12 functions may be implemented in physically distinct hardware, or combined into a single piece of equipment such as in the case of the network access server discussed in conjunction with FIG. 2.

In a preferred form of the present invention, the byte to byte transparency translation processing required by the PPP (or SLIP) protocol is distributed to the DCE 10 processor, rather than being performed in a computing platform in the router or terminal server 12 as in the prior art. This frees the application processor (such as the computing platform at router or terminal server 12) from this time consuming task.

The modem 10 processor already deals with the data on a byte by byte process as it passes data to or from the modem's data pump. The additional task of data transparency and FCS calculating is not as burdensome as it is for a multi-session application, and hence the modem processor is a preferred computing platform in which to implement the invention.

In our preferred form of the invention, the application software processor at the network interface communicates with the modems 10 via a packet bus, but the communication could be by other equivalent means, such as an RS 232 cable. Two types of messages are passed between them, configure requests and responses, and data. Other message types are currently not applicable to this implementation. All messages have a status field and a length field. There is exactly one PPP or SLIP frame transmitted or received per each packet bus data message. The length field holds the exact number of untranslated data bytes. This is how the modem knows where to insert the flag sequence on outgoing frames.

The basic design of the PPP/SLIP modem 10 is for the gateway application software at the router/terminal server 12 to issue a special command to the modem 10 that puts the modem into PPP mode, SLIP mode, or neither. Other configuration commands that can be issued include: local Async-Control-Character-Map, remote Async-Control-Character-Map, local Delete character translation (i.e. ASCII 7F hex), remote Delete character translation, maximum frame size, frame timeout, inter-character timeout, and FCS type (eg. CCITT 16 bit CRC). The modem 10 informs the application software when it is successfully configured.

When the modem 10 receives a data message from the application layer for transmission to the remote PC 20, the modem 10 knows how much data is in the message from the length field. The modem then creates a PPP or SLIP frame by transmitting a frame end character, transmitting the data (translating as required), calculating and transmitting the FCS if it is a PPP frame, then transmitting another frame end character. Note that the PPP address and control fields should be prepended to the PPP data when passed to the modem because the modem does not interpret any data.

When the modem 10 receives a PPP or SLIP frame from the remote location, the modem 10 searches for start of the frame character (which is also the frame end character). This character is discarded. The modem then examines each incoming byte of data, translating transparent data as required and keeping a current FCS if it is a PPP frame, while looking for the trailing frame end character. The trailing frame end character is also discarded. If the modem is configured for PPP, the current FCS value is confirmed to be valid and the last two (or four) data characters, which are the FCS characters, are also discarded (i.e., the length is decremented). This frame of raw data (prepended by the address and control fields if PPP) is immediately passed to the application layer in the gateway (such as the router/terminal server 12) via a packet bus or an equivalent means, such as an RS 232 cable. Status values indicate OK, invalid FCS, frame too large, inter-char timeout, frame timeout, and parity error (frame aborts are discarded and the application layer is not informed).

Note that, using the techniques of the present invention, the application computing platform at the network interface never sees any transparent data. It deals with the actual information in the PPP or SLIP frame. Also note that the modem does not interpret the contents of any PPP or SLIP frame. It only does the most basic encapsulation of a datagram over a serial link, i.e., byte by byte transparency translation and FCS. The PPP address and control field and any negotiation, such as LCP or IPCP, are handled at the application software layer. Accordingly, by using the techniques of the present invention, data through-put in both the uploading and downloading directions through the modem 10 and router/terminal server 12 is greatly improved. This is a result of both reduced processing requirements at the gateway computing platform, and a lower overall latency of the system.

Referring again to FIG. 1A, it will be understood that other analogous and functionally equivalent DCE's may be used in accordance with the invention besides the modem 10. For example, other kinds of modems, such as a DSU (data synchronizer unit) and CSU (circuit switching unit) may be used in conjunction with a digital data network 50. An ISDN (integrated services digital network) terminal adapter may also be used where the calls come in via ISDN lines. The term "modem" in the claims is intended to be broadly interpreted to include all such functionally equivalent devices.

Figure 1B:
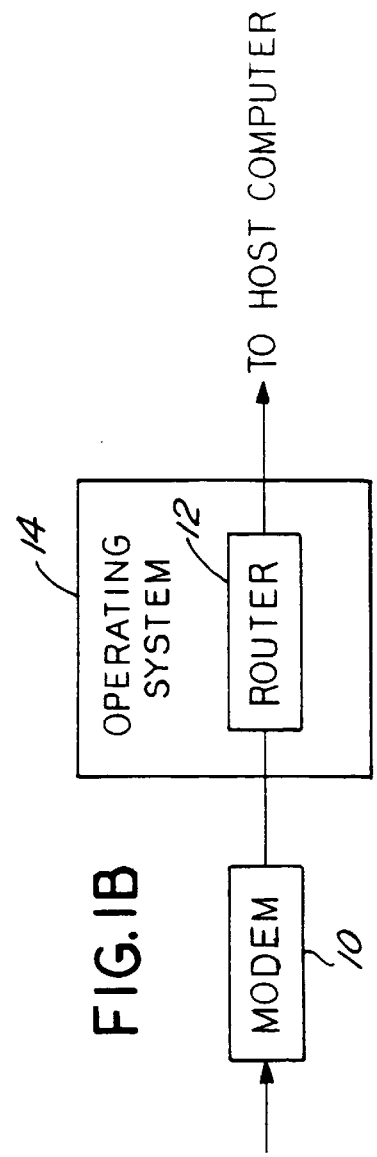
FIG. 1B is a block diagram illustrating the implementation of the routing function of FIG. 1A in the operating system software of a host computer.

Referring to FIG. 1B, it will be appreciated that the physical location of the router or terminal server 12 is not particularly important. For example, the router function may exist as a software feature in an operating system 14 for a personal computer, for example, the various versions of the Windows® program of Microsoft Corporation. In this example, the protocol processing is performed in the modem 10. By virtue of the distribution of the protocol processing to the computing platform in the modem 10, rather than in the CPU for the computer, the computational load on the CPU and the latency in the call routing process are reduced, providing for increased call throughput.

Additionally, the particular means for transmitting the calls from the modem to the gateway is not particularly important. An RS 232 cable, a packet bus, or the internal bus of a host personal computer (such as the ISA, EISA, PCI or a VESA bus) may be used.

II. Preferred Network Access Server Implementation

The present invention is implemented in a communication processing system that is depicted generally in FIG. 2. A plurality of call originators 20, 22 and 24 are located at various remote locations, which transmit incoming communications to a network access server 30. Call originator 20, 22 and 20 may consist of a personal computers C1, C2 and C3, respectively, that generates digital data and transmits the data to a modems M1, M2, and M3, which modulate the data onto a telephone lines 40, 42 and 44, respectively. For the purpose of this specification, the particular type of call originators is not important, and the call originators of FIG. 2 are chosen for purposes of illustration only. The call originators have communication software that uses the PPP or SLIP protocol.

In FIG. 2, the data that is transmitted onto the telephone lines at 40, 42 and 44 is in analog form. The illustration in FIG. 2 assumes that the communication system makes use of the digital public switched telephone network (PSTN) 50 such as the T1 network. The calls from the call originators are digitized and placed into one of the 24 multiplexed channels of the four-wire T1 span line 51 by the telephone company and fed into the network access server 30. As used herein, the term T1 span line refers to twenty-four 64 kbps (thousand bit per second) DS0 channels that are multiplexed in the 1.544 Mbps DS1 rate, with each DS0 channel carrying the digital representation of an analog voice channel. The term "trunk", as used herein, refers to a single DS0 channel.

The digital signals representing the incoming communications are fed into the network access server 30 by the T1 span line 51 (or possibly two span lines). The network access server 30 then routes the incoming call onto the network 52. The network may be a Token ring network, Ethernet, or other type of network, the particular details of which are not important. The host computer system 60 then receives the call and processes the calls as needed. The host computer system 60 depicted in FIG. 2 consists of a variety of computers such as a personal computer C4, data storage terminal C5, and mainframe computer C3. As was the case with the call originators 20, 22 and 24. the details of the host computer system 60 and its constituent components, are not particularly important. The host computer system 60 has the capability of sending out calls via the network access server 30 to the remote data terminals (such as call originator 20).

Figure 3:
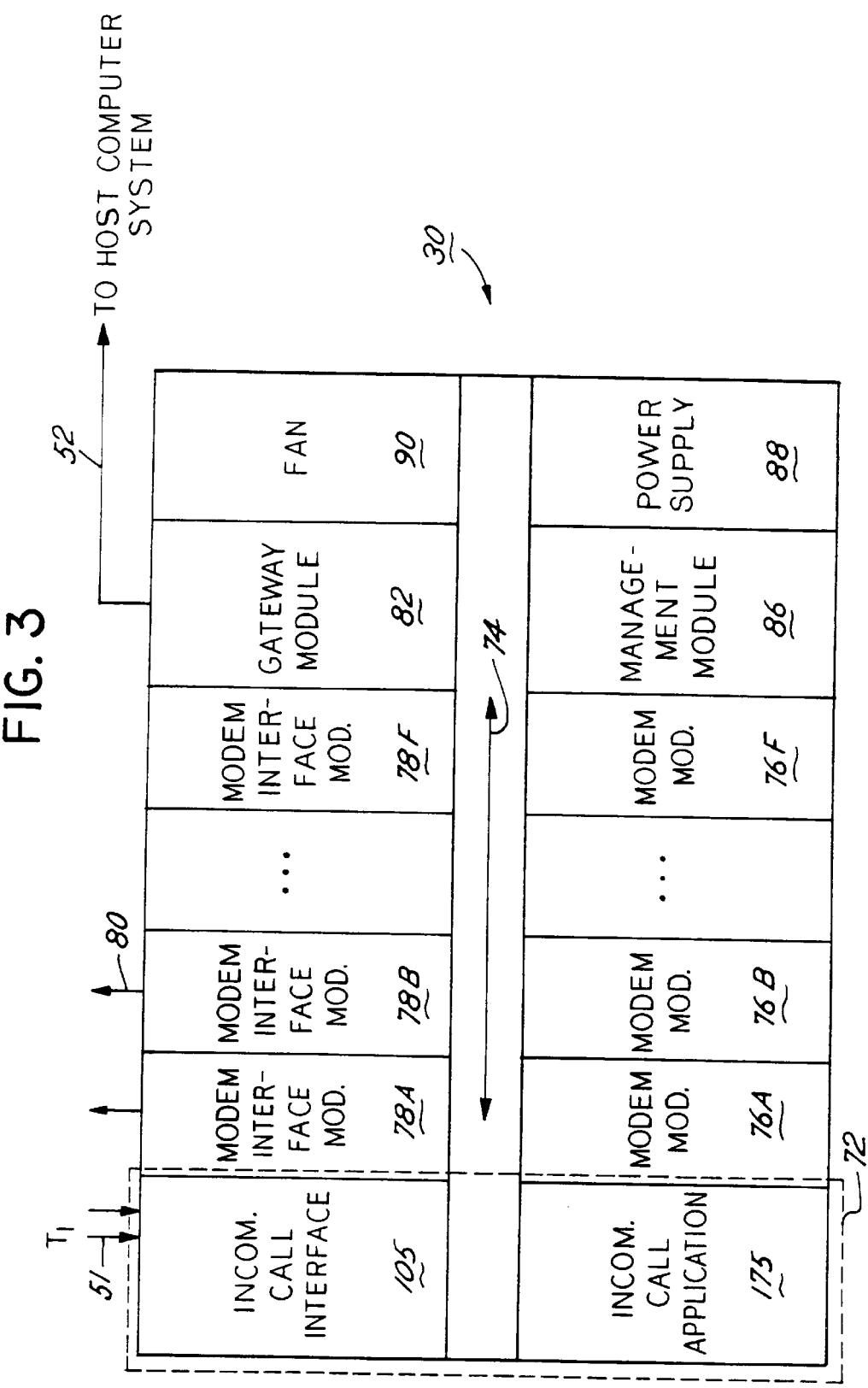
FIG. 3 is a schematic block diagram of the network access server of FIG. 1.

Referring now to FIG. 3, the network access server 30 is shown in a functional block diagram form and will be described in more detail. The network access server 30 has a chassis 70 which houses a telephone interface unit 72 which receives the incoming calls on T1 span line 51 demultiplexes the calls, and routes the calls over a high speed time division multiplexed (TDM) bus complex 74 to twelve quad modem modules 76A, 76B, etc. Each modem module 76 has four modems (not shown in FIG. 3) which demodulate the incoming calls. Thus, if there are two T1 span lines 51 incoming to the network access server 30, there are 48 modems in all for the 48 DS0 channels incoming into the network access server 30. The connections on the TDM bus complex between the telephone interface unit and the modems are static or "nailed up" connections, and are established on power-up of the network access server 30. The TDM bus complex 74 carries data back and forth between all of the various modules of the network access server 30. The bus complex 74 is described in greater detail below.

Each modem module 76 is provided with a corresponding modem network interface module 78A, 78B, etc. The modem network interface modules 78 have four sync/async RS 232 ports 80. The RS 232 ports 80 are linked to computers of the host computer system and may be used to output the calls from the network access server 30 to the host computer (and thus act as a "network" 52 as that term is used herein).

The network access server 30 also includes a gateway application module 82, which functions as an interface between the software which governs the operation of the network access server 30 and the software of the host computer system. The gateway application module 82 tells the modems in the modem modules 76 what modulation scheme to use for the incoming calls, whether the call is synchronous or asynchronous, and what error correction protocol to follow. The gateway application module 82 also tells the modems whether to send the calls out the RS 232 ports 80 or whether to send the calls to the network 52 and host computer system 60. The gateway application module 82 contains suitable data processors, memories and other hardware, the details of which those of skill in the art are familiar and are not of particular importance here. A network management module 86 provides management and supervision functions for the network access server 30.

A power supply module 88, supplying power to all the modules in the incoming call interface, is also incorporated into the chassis 70. The power supply module consists of two power supply units that perform ac to dc power conversion, providing full redundancy in the case of failure in one of the units. The power supply units in module 88 are designed according to standard methodologies. A high speed cooling fan 90 is provided in the chassis 70 to dissipate heat generated by the power supplies during operation of the network access server. A power on/off switch (not shown) is provided to turn the whole unit 30 on and off.

The chassis 70 is a standard 19" card cage, and has provisions for 16 front-loading application cards and 16 rear-loading interface cards, and a network management module and associated interface module.

A. Telephone Interface Unit 72

The telephone interface unit 72 of FIG. 3 is composed of two separate modules, an incoming call interface module 105 and an incoming call application module 175. The purpose of interface module 105 is to physically receive the incoming T1 span lines, convert the signal in a digital TTL format, and deliver the signal to the call application module 175. Interface module 105 provides a CSU interface which recovers clock signals and data from the incoming T1 signals, and also provides the transmission of outgoing digital telephone signals representing digital data to line T1. Module 105 is connected to application module 175 via a backplane connector. Application module 175 provides framing of recovered T1 data to extract the T1 DS0 channel data and then switches the channel data to the modem modules 76 via the TDM bus 74.

It will be appreciated that the time division multiplex (TDM) bus complex 74 includes a frame sync line, a time slot (TS) clock line, a bit clock line and two data highway lines. A packet bus is also provided for transmitting communications between the modules of the network access server 30.

Figure 4:
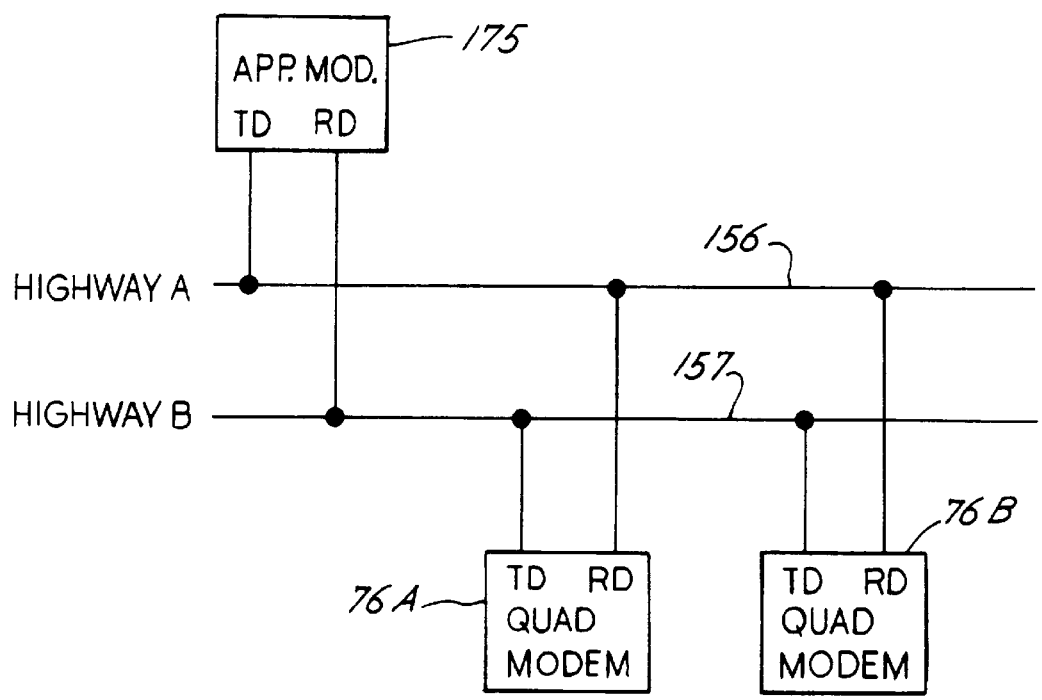
FIG. 4 is a schematic block diagram showing the connection of the application module and the modem modules of FIG. 3.

As shown in FIG. 4, data is directly written from the transmit (TD) terminal of application module 175 (FIG. 3) to the receive terminal (RD) of one of the quad modems (e.g., 76A or 76B) and vice versa, via data highway lines 156, 157.

B. Modem Modules 76 and 78 Detailed Description

Figure 5:
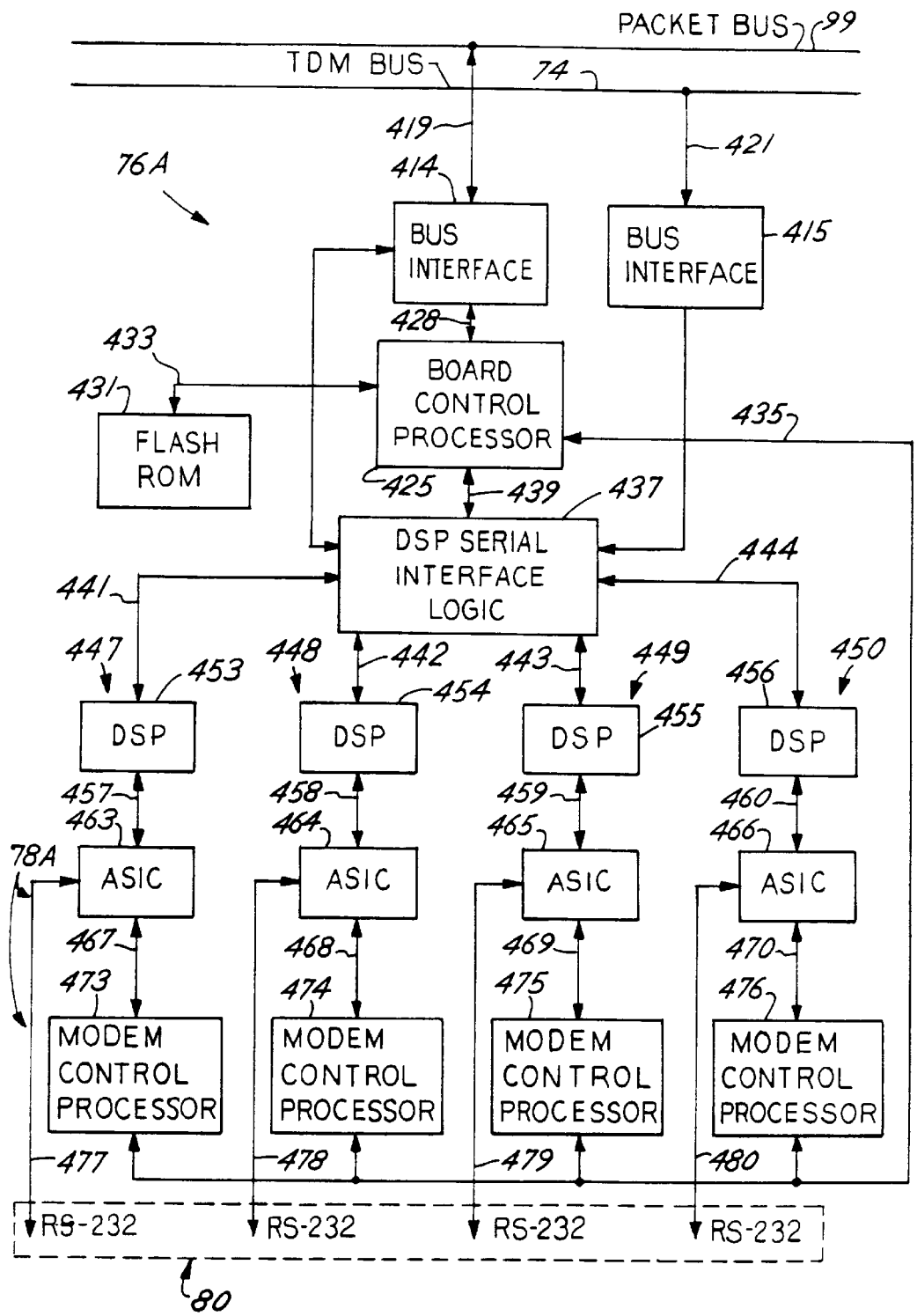
FIG. 5 is a detailed block diagram of a preferred form of a quad modem module of the type shown in FIG. 3, the distributed processing according to the present invention being performed by the modem module processing units.

FIG. 5 illustrates a representative quad modem module 76 A which is identical to the other modem modules of the network access server. Each of modem modules 76 contains four modems for a total of 20 modems. As a result, the network access server 30 can handle a total of 20 simultaneous full duplex channels of data communication. If two T1 span lines are inputted into telephone interface unit 72 (FIG. 3) then 12 modem modules may be provided to handle 48 simultaneous full duplex channels. Of course, additional capacity may be provided if desired.

Modem module 76A comprises a bus interface unit 414 that communicates with packet bus 99 through output bus 419. A board control processor 425 communicates over buses 428, 433 and 435. A flash ROM 431 provides memory for processor 425. Flash ROM also contains the code for the modem control processors 473–476 as well as the digital signal processors 453–456. Bus interface 415 communicates with TDM bus 74 over bus 421.

Digital signal processor serial interface logic 437 communicates with processor 425 over a bus 439 and communicates with individual modems 447–450 over buses 441–444, respectively. Each of modems 447–450 is identical. The modems comprise digital signal processors 453–456, application specific integrated circuits (ASICs) 463–466 and modem control processors 473–476 connected as shown over buses 457–460 and 467–470. Processors 473–476 communicate with processor 425 over bus 435. ASICs 463–466 provide RS-232 ports 477–480. These ports, together with the comparable ports from modem modules 76B–76F form a group of modem network interface modules 78A–78F (FIG. 3) for coupling digital signals to the host computer system. The hardware for each of modems 447–450 is substantially the same as the hardware found in the USR Courier Dual Standard modem manufactured by U.S. Robotics, Inc., Skokie, Ill.

Board control processor 425 performs the following functions: control of the reception and transmission of packets to and from a management bus (not shown), multiplexing tasks for the packet bus 99, controlling the code set for the entire modem module 76A, and distributing (i.e., downloading) code to the modems in the module 76A.

Interface logic 437 performs the following functions: handles the interface to the TDM bus 74, counts the time slots, and multiplexes and demultiplexes signals in the TDM bus 74.

The protocol processing for the incoming and outgoing calls, in the present embodiment of the invention, is distributed among the four modem control processors 473, 474, 475, and 476. The data processing and modem control processing functions of DSP 453 and modem control processor 473 may be combined into a single digital signal processor. The circuits shown in FIG. 6 are available commercially as indicated in the following table:

| Circuits | Manufacturer & Model Number |
| --- | --- |
| Bus interface 414 | Xilinx 3064 |
| Board control processor 425 | Intel 80C188EB |
| Flash ROM 431 | Intel 28F020 |
| DSP serial interface logic 437 | Xilinx 3042 |
| DSPs 453–456 | Tex. Inst. 32OC51 |
| ASICs 463–466 | US Rob. 1.016.684 |
| Modem control processors 473–476 | Intel 80C188EB |

III. Distributed Processing of PPP and SLIP protocols

Figure 6:
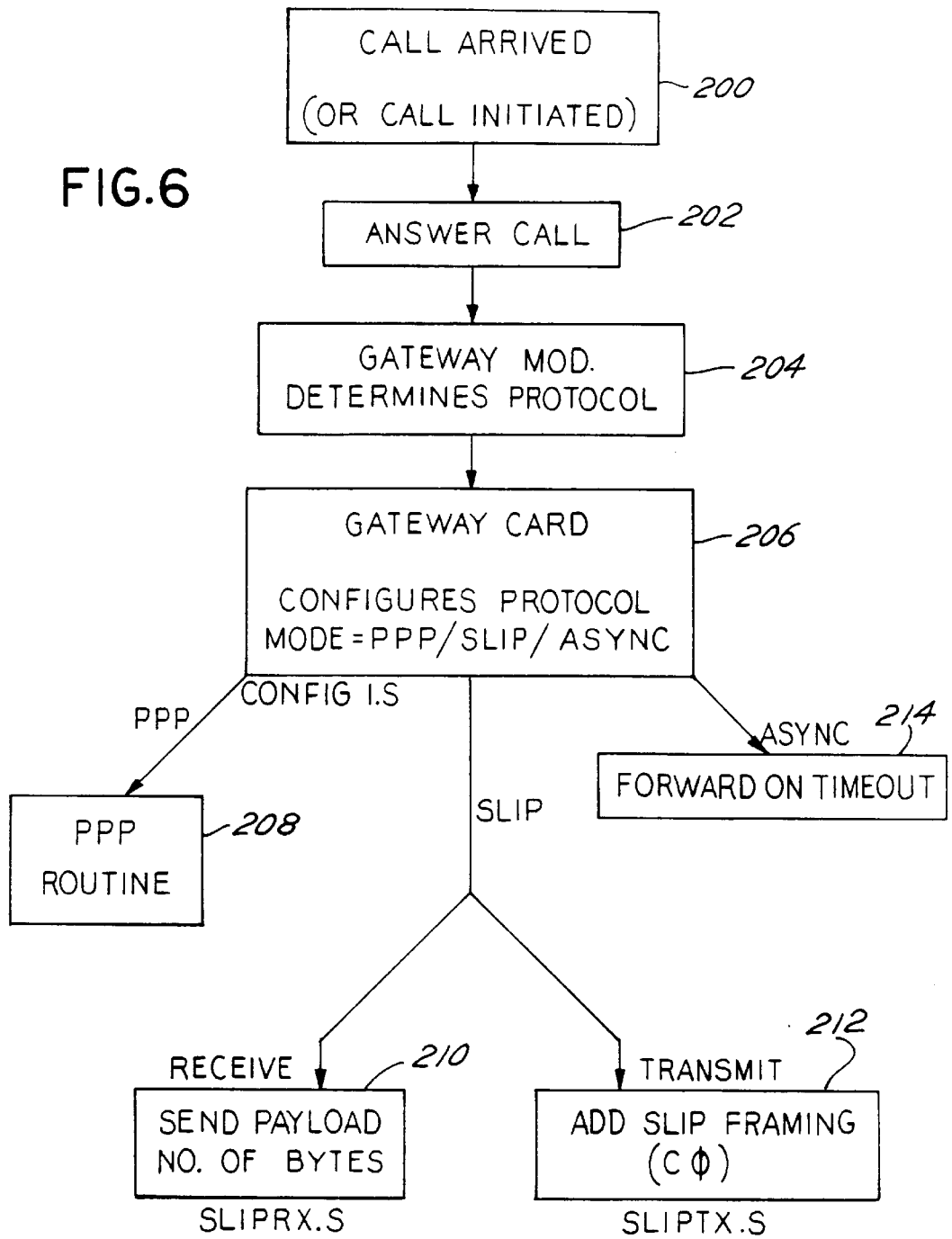
FIG. 6 is a flow chart of the distributed processing procedure.

With the above description in mind, the reader's attention is directed to FIG. 6, which is a flow chart of the distributed processing procedure according to the preferred form of the present invention. The following discussion is made in reference to the network access server embodiment of the invention, and persons of ordinary skill in the art will readily understand that the description can be adapted to other possible embodiments.

At step 200, a call is arrived from one of the remote call originators, or else a call is initiated from the host computer system to a remote computer or other data terminal. At step 202, the call is answered in a well known manner. At step 204, the gateway application module 82 (FIG. 3) determines the protocol of the incoming or outgoing call. This is done by determining, for example, the port configuration of the call, by the telephone number of the call originator or the call destination, by conversation or menu with the user, by the user name and a database look-up, by an automatic detect or inspection of data routine, or whatever other process is implemented.

At step 206 the gateway module 82 configures the protocol mode for the modem. The software routine in CONFIG1.S is implemented in this step. If the asynchronous transparent protocol is performed, at step 214 a forward on timeout or buffer full command is sent to the modem in the modems module 76. If the SLIP protocol is used, for receiving calls at step 210 the modems remove transparency and translation characters, and send the payload (a number of bytes) or overflow errors to the gateway module 82. In the appended software listing, routines in SLIPRX.S are implemented at this step. For transmitting calls, at step 212 the modems add transparency translation characters and a SLIP framing character. In the appended software listing, the routines in SLIPTX.S are implemented.

Figure 7:
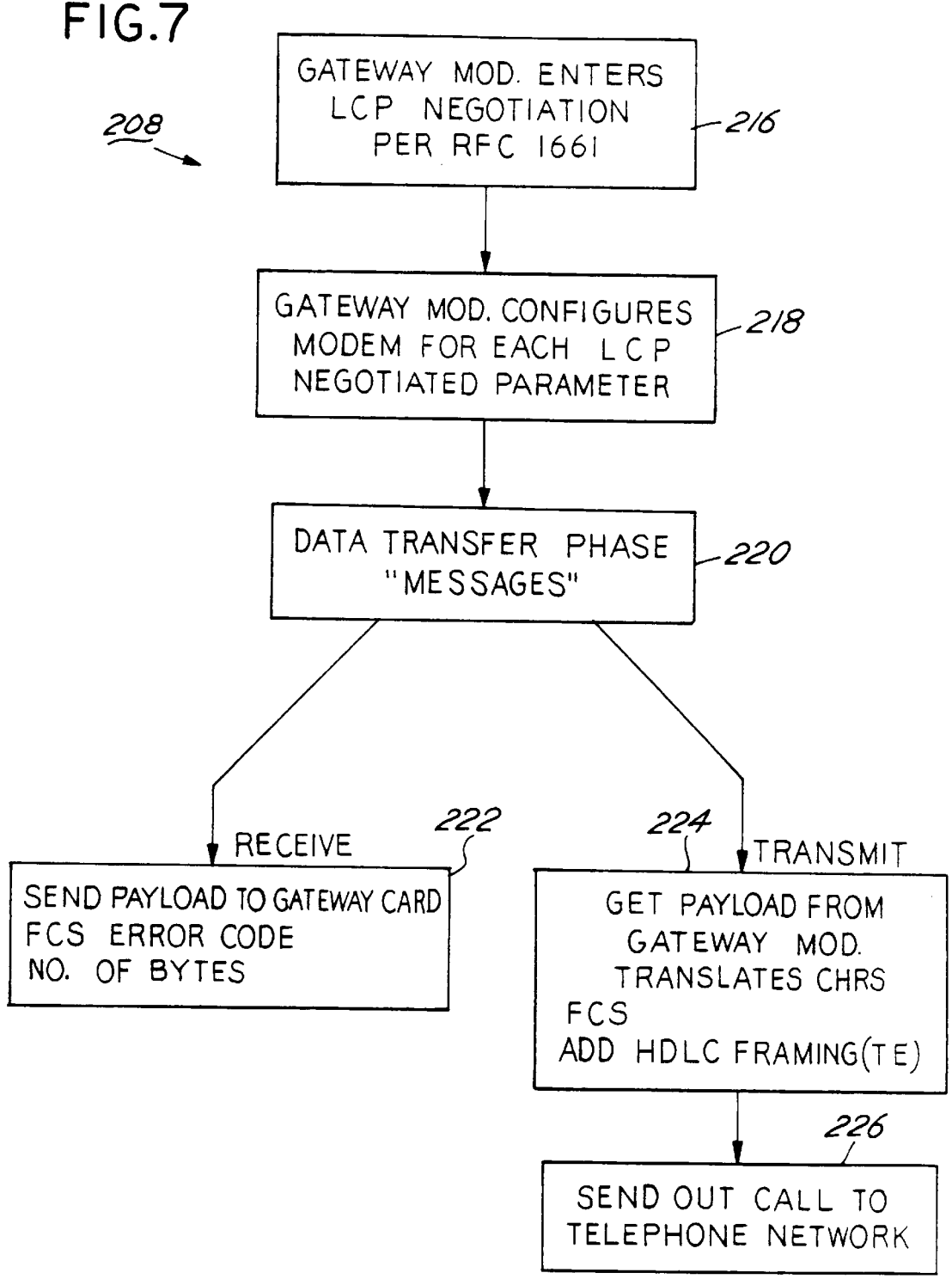
FIG. 7 is a detailed flow chart of the PPP routine of FIG. 6.

If PPP protocol is used, the routine in CONFIG1.S is implemented at step 208. Step 208 of FIG. 6 is shown in detail in FIG. 7. Referring now to FIG. 7, at step 216 the gateway module 82 enters the LCP negotiation procedure per the instructions set forth in the Request For Comments: 1661 Standard, which is incorporated by reference herein. The Requests For Comments (RFC) 1661 Standard is a publicly available document which specifies an Internet standards track protocol for the Internet community. Persons of ordinary skill in the art are familiar with the RFC 1661 document.

At step 218, the gateway module configures the modems for each LCP negotiated parameter. This may be accomplished in order, for example, MTU, TX Async map, RX Async map. In the appended software listings, the routine in CONFIG2.S describe this procedure. The procedure then enters a data transfer phase at step 220 in which "messages" are uploaded or downloaded through the network access server 30. In the receiving or uploading direction, the modems remove the HDLC frame characters, and send the payload, number of bytes and error code (such as good FCS, bad FCS, overrun, or partial). This procedure is set forth in the appended software listing PPPRX.S.

In the transmitting (downloading) direction at step 224, the modems get the payload from the gateway module 82, perform character transparency translation and transmit asynchronous map, calculate the FCS, and add HDLC framing characters. At step 226, the messages are sent out through the telephone network 51. This procedure is set forth in the PPPIX.S routine in the appended listing.

Figure 8:
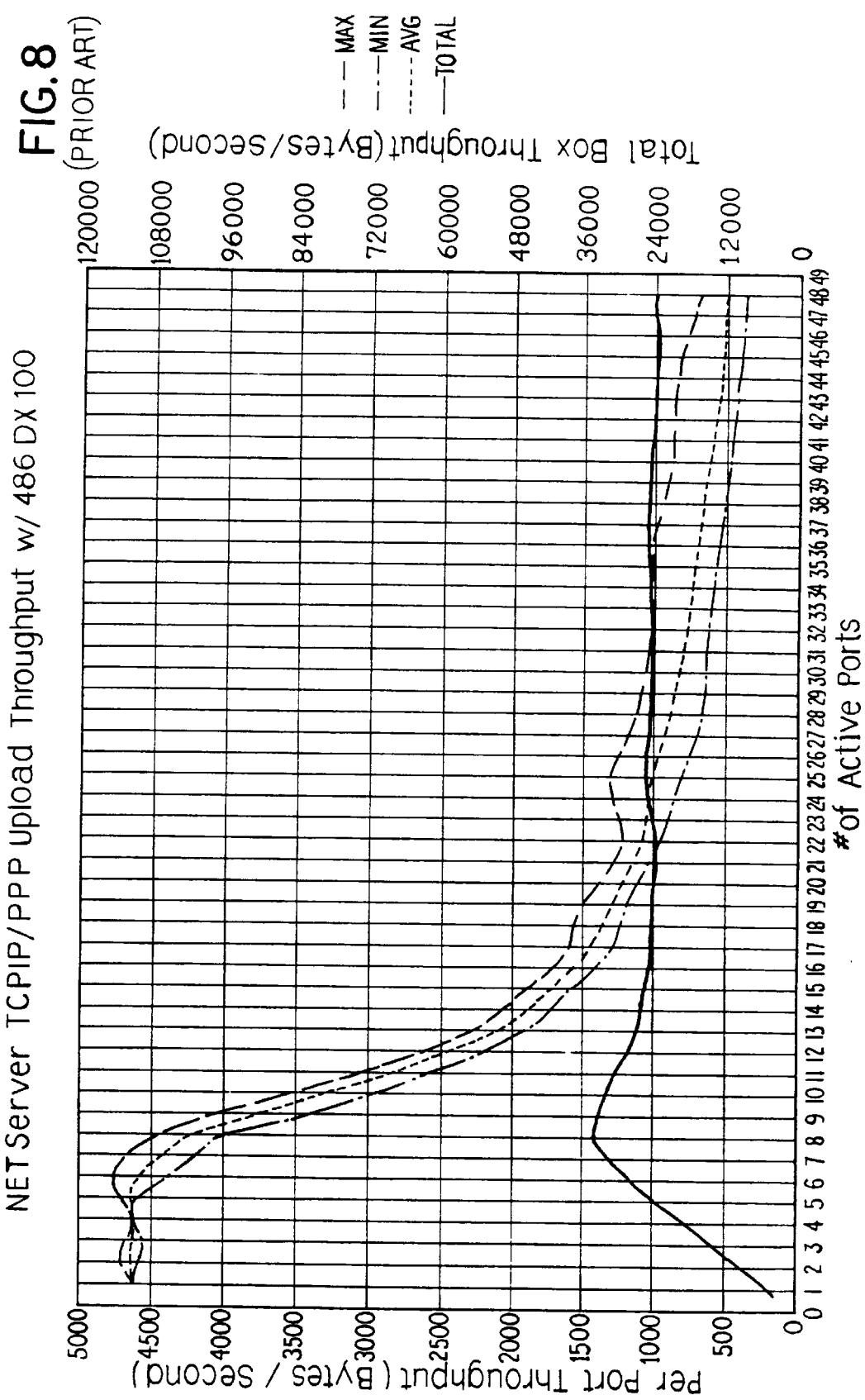
FIG. 8 is a graph of the upload throughput using prior art computation in a single platform at the PPP protocol network gateway.

One representative example illustrating the advantages of the invention in terms of throughput over the prior art methods can be seen in FIGS. 8–11. FIG. 8 is a graph of the upload throughput using prior art computation in a single platform at the PPP protocol network gateway. Note that the total throughput of the network access server remains substantially constant after a peak is reached with 8 active ports and levels out at 17 active ports at 24,000 bytes per second. The per port throughput starts off quite high at roughly 4600 bytes per second for a small number of active ports (that is, less than 10), but drops dramatically at higher numbers of active ports. Thus, FIG. 8 illustrates the processing "bottleneck" that occurs when the PPP protocol processing is performed in a single platform at the network interface.

Figure 9:
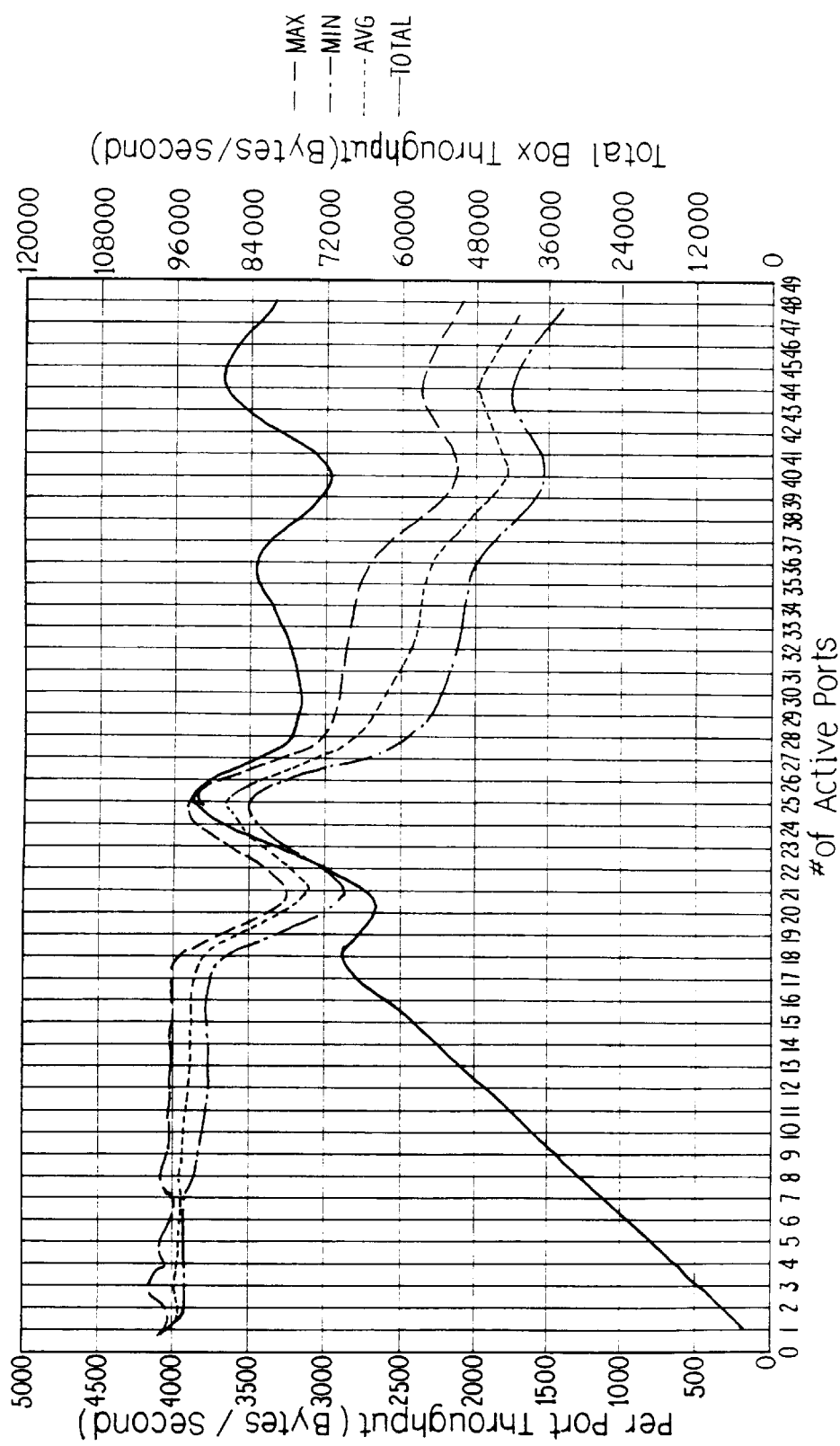
FIG. 9 is a graph of the upload throughput when the distributed processing technique according to the teaching of the present invention is used.

FIG. 9 is a graph of the upload throughput when the distributed processing technique according to the teaching of the present invention is used. Note that in FIG. 9 the total throughput rises steadily up to 18 ports, dips slightly between 18 and 21 ports, and then increases up to total throughput of approximately 92,000 bytes per second with 25 active ports. Between 25 and 48 active ports, the total throughput remains between roughly 72,000 bytes per second and 86,000 bytes per second. This is approximately 3 to 4 times the total throughput as compared to the results of FIG. 7. The inventors predict that further improvements in system tuning would smooth out the oscillations in system throughput shown in FIG. 9, especially for higher numbers of active ports. Note also that the average per port throughput using the techniques of the present invention remains relatively high as the number of active ports increases, accomplishing an efficiency improvement of more than 3 times compared to the results of FIG. 8, particularly at higher volumes of active ports.

Figure 10:
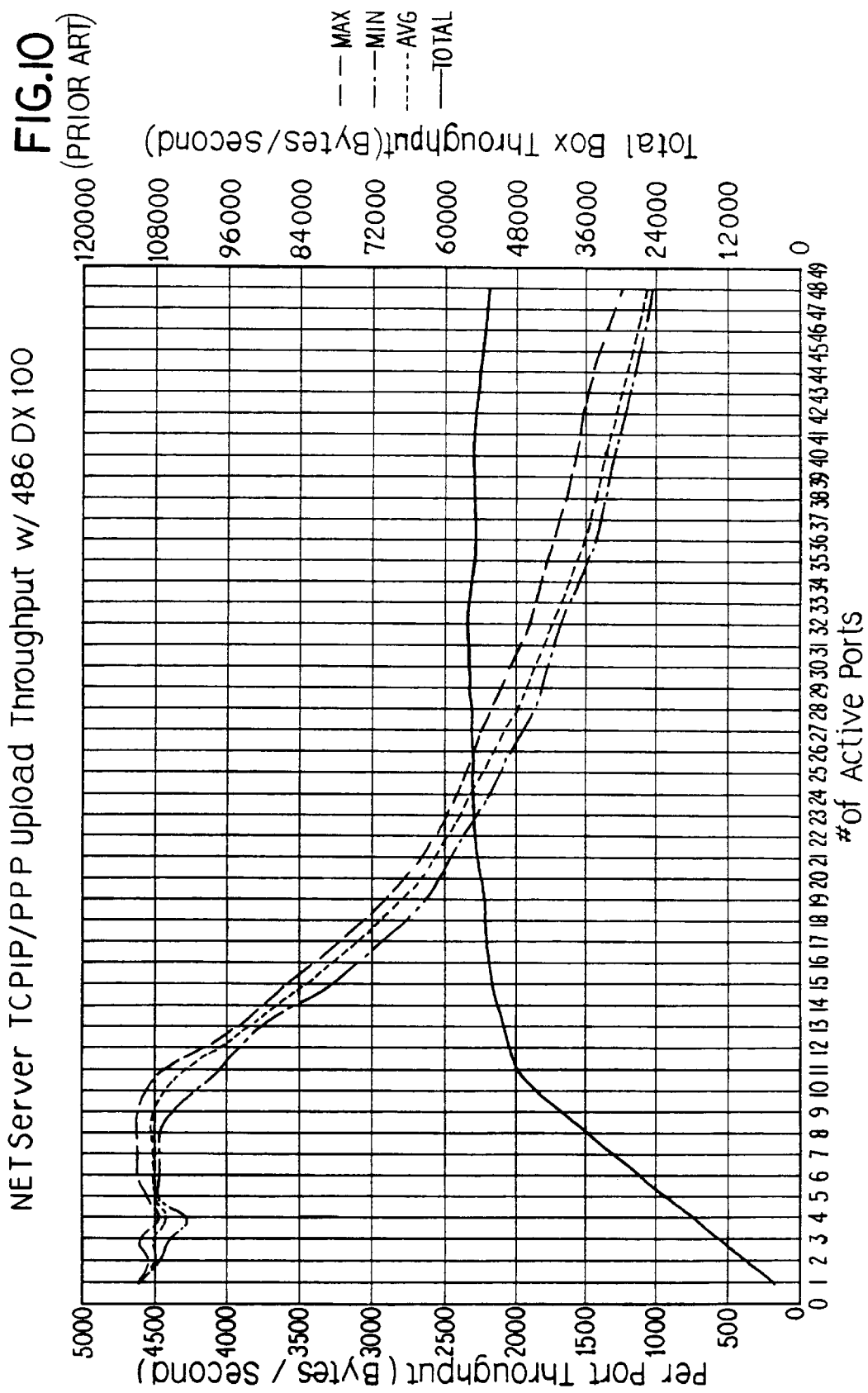
FIG. 10 is a graph of the download throughput when the PPP processing is performed according to the prior art technique of a single platform at the network gateway.

FIG. 10 is a graph of the download throughput when the PPP processing is performed in the prior art technique of a single platform at the network gateway. In FIG. 10, note that the total download throughput levels off at approximately 55,00 bytes per second between above 20 active ports when the prior art techniques are used. The average per port throughput starts at roughly 45,000 bytes per second with under 10 active ports, but this value drops steadily to a low of approximately 12,000 bytes per second when 48 active ports are used.

FIG. 11 is a graph of the download throughput when the distributed processing technique according to the teachings of the present invention is used. Note that the total download throughput using the techniques of the present invention rises steadily to a high of approximately 104,000 bytes per second when 26 active ports are used and remains relatively constant at higher levels of call activity. As can been seen by comparison of FIG. 11 to FIG. 10, this is a substantial improvement in call throughput. The average per port throughput using the techniques of the invention remains relatively constant at 4500 bytes per second up to 22 ports and this value drops gradually to approximately 2000 bytes per second when 48 ports are used. This represents an improvement of approximately 2 to 1 over the download per port throughput, particularly at higher call volumes.

Presently preferred software routines for implementing the procedures shown in FIG. 6 and FIG. 7 are set forth in code form below. A person of ordinary skill in the art will appreciate that the code represents but one example of the implementation of the invention in a network access server environment. The code is stored and executed in the modems of the modem modules 76 of FIG. 3. The software routines in the gateway module 82 that interact with the modem software routines comprise relatively simple higher level control routines, with which can be readily developed by persons of ordinary skill in the art.

The reader is directed to the Notice Regarding Copyright set forth above, which is incorporated by reference here.

© 1995 U.S. Robotics Corp.

CONFIG1.S
```
;****************************************************************
;*                                                              *
;*      Pap_config_ppp_slip_mode                                *
;*                                                              *
;*      Depending upon the mode, this configure routine sets the *
;*      appropriate variables. There are no errors, if unknown command *
;*      parameter then it defaults to non-SLIP/non-PPP. The state *
;*      machine is set to return an OK response pkt or an error *
;*      response if the mode is invalid.                        *
;*                                                              *
;*      Interprets a pBus pkt whose format is:                  *
;*                                                              *
;*      <PAP_CTRLW_CONFIGURE><PAP_PPP_SLIP_MODE><length=1><mode> *
;*                                                              *
;****************************************************************

Public Pap_config_ppp_slip_mode
        pap_config_ppp_slip_mode        proc    near
                add     Nwbus_si_ptr,2          ;skip length word
                sub     Nwbus_msg_count,2
                mov     si,Nwbus_si_ptr
                cmp     byte ptr [si],PAP_MODE_PPP
                jne     #config_mode_slip ;PPP mode
                mov     ppp_slip_mode,PAP_MODE_PPP
                ;mov    pppslip_mtu,MTU_ABSOLUTE_MAX_PPP ;Tx_Data_State gets set to PPP_Transmit_tx_Data in routine Ctrlw_data
                ;after it checks the current mode using variable ppp_slip_mode.
                mov     Tx_Data_State,offset Transmit_Idle_State
                mov     tx_state_machine,offset dummy_return
                mov     rx_state_machine,offset dummy_return mov     application_tx_state,offset ppp_tx_appl
                mov     application_rx_state,offset ppp_rx_appl_start mov     bcc_type,PAP_BCC_TYPE_CCITT16   ;default, may be changed later IF      PPPSLIP_DEBUG
                call    Turn_LED_Red_Far
        ENDIF
```

24

```
              jmp    #config_all_modes config_mode_slip:
              cmp    byte ptr [si],PAP_MODE_SLIP
              jne    #config_mode_direct 5            ;SLIP mode
              mov    ppp_slip_mode,PAP_MODE_SLIP
              ;mov   pppslip_mtu,MTU_ABSOLUTE_MAX_SLIP ;Tx_Data_State gets set to PPP_Transmit_tx_Data in routine Ctrlw_data
              ;after it checks the current mode using variable ppp_slip_mode.
10            mov    Tx_Data_State,offset Transmit_Idle_State
              mov    tx_state_machine,offset dummy_return
              mov    rx_state_machine,offset dummy_return mov    application_tx_state,offset slip_tx_appl
              mov    application_rx_state,offset slip_rx_appl_start 15     IF     PPPSLIP_DEBUG
              call   Turn_LED_Yellow_Far
       ENDIF jmp    #config_all_modes config_mode_direct:
20            cmp    byte ptr [si],PAP_MODE_NO_TRANSLATION
              jne    #config_mode_error ;direct mode
              mov    ppp_slip_mode,PAP_MODE_NO_TRANSLATION
              ;mov   pppslip_mtu,MTU_DIRECT_MODE 25            ;Set up tx_state_machine,rx_state_machine,Tx_Data_State,
              ;application_tx_state, & application_rx_state
              call   Init_State_Machines config_all_modes:
              ;Clear out the RC buffer and throw out any data that overflowed to pbus
30            push   si
              mov    si,ss:r_store_ptr
              mov    ss:r_load_ptr,si
              mov    buf_cur_allocated,0
              pop    si
```

25

```
            or      tx_state,(Send_Ok_Config_Resp)
            ret config_mode_error:
            or      tx_state1,(Report_Bad_Indicator)
5   dummy_return:
            ret
    pap_config_ppp_slip_mode        endp
```

```
     CONFIG2.S
     ;******************************************************************
     ;*                                                                *
     ;*     pap_config_ppp_slip_mtu                                    *
     ;*                                                                *
5    ;*     This configure command initializes pppslip_mtu, ie. the max *
     ;*     PPP or SLIP frame size. The state machine is set to return an *
     ;*     error response pkt if the value is too large or the mode is not *
     ;*     PPP or SLIP. Otherwise the state machine is set to return OK. *
     ;*                                                                *
10   ;*     Interprets a pBus pkt whose format is:                     *
     ;*     <PAP_CTRLW_CONFIGURE><PAP_PPP_SLIP_MTU><lenght=2><word value>
     ;*                                                                *
     ;******************************************************************

15   Public Pap_config_ppp_slip_mtu
     pap_config_ppp_slip_mtu     proc    near
               add    Nwbus_si_ptr,2          ;skip length word
               sub    Nwbus_msg_Count,2
               mov    si,Nwbus_si_ptr
20             mov    ax,[si]                 ;ax has max frame size
               call   handle_frame_ptrs       ;update working ptrs ;; 1-20-95 took out max size check
     ;;        cmp    ppp_slip_mode,PAP_MODE_PPP
     ;;        jne    #mtu_slip_test          ;jump if not PPP mode
25   ;;        cmp    ax,MTU_ABSOLUTE_MAX_PPP
     ;;        jg     #mtu_error
     ;;        jmp    #mtu_end
     ;;
     ;;#mtu_slip_test:
30   ;;        cmp    ppp_slip_mode,PAP_MODE_SLIP
     ;;        jne    #mtu_error              ;jump if not SLIP mode
     ;;        cmp    ax,MTU_ABSOLUTE_MAX_SLIP
     ;;        jg     #mtu_error
     ;;
35   ;;#mtu_end:
               mov    pppslip_mtu,ax
               or     tx_state,(Send_Ok_Config_Resp)
               ret ;;#mtu_error:
40   ;;        or     tx_state1,(Report_Bad_Indicator)
```

```
;;      ret
pap_config_ppp_slip_mtu         endp

;********************************************************************
;*      Pap_config_ppp_in_accm & Pap_config_ppp_out_accm             *
;*                                                                   *
;*      These configure routines initialize the inbound or outbound  *
;*      Async-Control_Char_Map table. The state machine is set       *
;*      to return an OK response pkt.                                *
;*                                                                   *
;*      Interprets a pBus pkt whose format is:                       *
;*                                                                   *
;*  <PAP_CTRLW_CONFIGURE><PAP_PPP_IN_ACCM><4><MSByte><><><LSByte>    *
;*              or                                                   *
;*                                                                   *
;*  <PAP_CTRLW_CONFIGURE><PAP_PPP_OUT_ACCM><4><MSByte><><><LSByte>   *
;*                                                                   *
;********************************************************************

Public Pap_config_ppp_in_accm
pap_config_ppp_in_accm          proc    near
;;      cmp     ppp_slip_mode,PAP_MODE_PPP
;;      jne     accm_error              ;only do this if in PPP mode add     Nwbus_si_ptr,2          ;skip length word
        sub     Nwbus_msg_count,2
        mov     si,Nwbus_si_ptr         ;si points to most significant accm byte push    di
        mov     di,offset ppp_rx_accm   ;Inbound map (local)
config_accm_end:
        call    accm_conversion
        pop     di ;call   handle_frame_ptrs       ;update working ptrs
        add     Nwbus_si_ptr,3          ;skip rest of data bytes
        sub     Nwbus_msg_count,3 or      tx_state,(Send_Ok_Config_Resp)
        ret
```

```
;;accm_error:
;;      ;call    handle_frame_ptrs   ;update working ptrs
;;      add     Nwbus_si_ptr,6       ;skip rest of data bytes
;;      sub     Nwbus_msg_count,6
;;      or      tx_state1,(Report_Bad_Indicator)
;;      ret
pap_config_ppp_in_accm          endp Public Pap_config_ppp_out_accm
pap_config_ppp_out_accm         proc    near
;;      cmp     ppp_slip_mode,PAP_MODE_PPP
;;      jne     accm_error           ;only do this if in PPP mode add     Nwbus_si_ptr,2       ;skip length word
        sub     Nwbus_msg_count,2
        mov     si,Nwbus_si_ptr      ;si points to most significant accm byte push    di
        mov     di,offset ppp_tx_accm ;Outbound map (remote)
        jmp     config_accm_end
pap_config_ppp_out_accm         endp ;**********************************************************************
;*      Pap_config_ppp_in_delete & Pap_config_ppp_out_delete          *
;*                                                                     *
;*      These configure routines initialize the inbound or outbound   *
;*      delete character translation enable. The state machine is set *
;*      to return an OK response pkt.                                 *
;*                                                                     *
;*      Interprets a pBus pkt whose format is:                        *
;*                                                                     *
;*<PAP_CTRLW_CONFIGURE><PAP_PPP_IN_DELETE><lenght=1><value>           *
;*              or                                                     *
;*<PAP_CTRLW_CONFIGURE><PAP_PPP_OUT_DELETE><lenght=1><value>          *
;*              value == 0 disables delete char translation           *
;*              value == !0 enables delete char translation           *
;*                                                                     *
;**********************************************************************

Public Pap_config_ppp_in_delete
```

29

```
        pap_config_ppp_in_delete   proc    near
                add     Nwbus_si_ptr,2          ;skip length word
                sub     Nwbus_msg_count,2
                mov     si,Nwbus_si_ptr         ;si points to value 5               mov     al,[si]
                mov     ppp_rx_delete_transl,al or      tx_state,(Send_Ok_Config_Resp)
                ret
        pap_config_ppp_in_delete   endp 10      Public Pap_config_ppp_out_delete
        pap_config_ppp_out_delete       proc    near
                add     Nwbus_si_ptr,2          ;skip length word
                sub     Nwbus_msg_count,2
                mov     si,Nwbus_si_ptr         ;si points to value 15              mov     al,[si]
                mov     ppp_tx_delete_transl,al or      tx_state,(Send_Ok_Config_Resp)
                ret
        pap_config_ppp_out_delete       endp
```

```
20      ;********************************************************************
        ;*                                                                  *
        ;*      accm_conversion                                             *
        ;*                                                    *
        ;*                                                             *
        ;*Bytes from pkt configuration command                     *
        ;*                                                           *
25      ;*byte[0]        byte[1]         byte[2]         byte[3]   *
        ;*                                                                 *
        ;*|3 3 2 2 2 2 2 2| |2 2 2 2 1 1 1 1| |1 1 1 1 1 1 0 0| |0 0 0 0 0 0 0 0| *
        ;*|1 0 9 8 7 6 5 4| |3 2 1 0 9 8 7 6| |5 4 3 2 1 0 9 8| |7 6 5 4 3 2 1 0| *
        ;*----------------  ----------------  ----------------  ----------------  *
30      ;*                                                                 *
        ;*These bits are converted to a 32 byte array, in the opposite order. *
        ;*Each byte in the 32 byte array will either equal its offset value or  *
        ;*its offset value exored with 20h.                                *
        ;* if (byte == offset value) use byte value only                   *
35      ;* if (byte == (offset value exor 20h)) use PPP_ESC then offset value     *
```

```
;*
;*eg. if the configure pkt data is 00h 0Fh FFh 55h,
;*   then the 32 byte ACCM array is:
;*
;*  20 01 22 03 24 05 26 07 28 29 2A 2B 2C 2D 2E 2F
;*  30 31 32 33 14 15 16 17 18 19 1A 1B 1C 1D 1E 1F
;*
;*  so if you want to see if 7 if flagged:
;*        if (accm[7] == 7)
;*            data stream gets <07>
;*        else
;*            data stream gets <PPP_ESC> <27>
;*
;*Assumptions for this routine:
;*   di = offset of accm table to put values into
;*   si = offset of 4 bitmapped byte array used to create the
;*        accm table (from pBus)
;*   Destroys AX,BX,CX
;*********************************************************** accm_conversion        proc   near
        push   si
        mov    bx,001Fh          ;BL = offset into accm
        mov    cx,4
#next_bitmap_byte:
        push   cx
        mov    al,[si]           ;AL = bitmapped byte from pBus pkt
        inc    si mov    cx,8              ;for each bit in AL
next_bit:
        shl    al,1
        jc     #flagged
        push   di
        add    di,bx
        mov    byte ptr [di],bl
        pop    di
        jmp    #end_of_bit_diddle flagged:
        push   di
        push   bx
        add    di,bx
        xor    bl,20h
```

```
              mov     byte ptr [di],bl
              pop     bx
              pop     di end_of_bit_diddle:
  5           dec     bl
              loop    #next_bit pop     cx
              loop    #next_bitmap_byte pop     si
 10           ret
       accm_conversion          endp
```

PPPRX.S
```
;**********************************************************************
;*      ppp_rx_appl_start                                             *
;*                                                                    *
;*      This routine's address is put into application_rx_state when  *
;*      all chars are to be ignored except for the PPP_FLAG char, which *
;*      indicates the start of a new PPP frame. This routine is called *
;*      with each incoming byte, in register AL.                      *
;*                                                                    *
;*      When the first PPP_FLAG char is received, application_rx_state *
;*      gets ppp_rx_appl's address. Ppp_rx_appl will then be called   *
;*      for each byte instead of this routine. Ppp_rx_appl cannot     *
;*      handle the first PPP_FLAG char because it assumes that when   *
;*      it receives a PPP_FLAG char, everything before it was a frame, *
;*      ie. if the data is: <garbage> <PPP_FLAG> <data> <PPP_FLAG> ... *
;*      <garbage> would be interpreted as a frame.                    *
;*                                                                    *
;**********************************************************************

Public Ppp_rx_appl_start
        ppp_rx_appl_start       proc    near
                push    ds
                push    NUBUS_RAM
                pop     ds call    chk_rx_timer            ;reset interchar timer cmp     link_parity,PAP_GEN_NO_PARITY
                je      #parity_done
                call    check_parity
                jc      #pras_exit              ;ignore error,
                and     al,07Fh                         ;strip parity
        #parity_done:

cmp     al,PPP_FLAG
                jne     #pras_exit              ;jump if not the starting frame char ;This is start of the first PPP frame, discard framing char.
                call    ppp_slip_rx_frame_init  ;reset variables for next frame ;Now call ppp_rx_appl, not ppp_rx_appl_start, when a char comes in
                mov     application_rx_state,offset ppp_rx_appl
```

```
            ;Set up timers
            call    chk_rx_timer          ;reset interchar timer
            cmp     X25_Timer_Status,X25_Timer_OFF_Implemented
            jne     #pras_exit
            mov     X25_Timer_Status,X25_Timer_ON pras_exit:
            pop     ds
            ret
      ppp_rx_appl_start         endp
```

```
;************************************************************
;*                                                          *
;*    ppp_rx_appl                                           *
;*                                                          *
;*    This routine's address is stored at application_rx_state, *
;*    which is called for each incoming byte (it is similar to  *
;*    routine x_25_rx_appl).                                 *
;*                                                          *
;*    This routine checks one byte of incoming data. That byte is *
;*    in register AL. It checks for PPP_FLAG, PPP_ESC, inbound ACCM *
;*    chars, FCS value, invalid frame size, and to ignore rest of *
;*    frame if the forward timer expired. When appropriate, the *
;*    incoming char is put into the RC buffer using routine *
;*    store_rx_char. The maximum frame size excludes PPP_ESC chars. *
;*                                                          *
;*    The translation done here is:                         *
;*    <PPP_ESC> <PPP_FLAG>     => frame abort               *
;*    <PPP_ESC> <x>            => <x exor 20H>              *
;*    <byte flagged in rx ACCM> => discard -prev char != PPP_FLAG *
;*                                                          *
;************************************************************ ppp_rx_appl               proc    near
            push    ds
            push    NUBUS_RAM
            pop     ds

;;;;;;;;;;;;;;;;;;;;
      ;; CHECK TIMERS ;;
      ;;;;;;;;;;;;;;;;;;;;

call    chk_rx_timer          ;reset interchar timer
```

```
            ;;The PPP/SLIP forward timer implementation requirement is that
            ;;when the forward timer expires before the end of frame char,
            ;;what has already been received is forwarded to the Gateway and
            ;;all subsequent chars upto the end of frame char are discarded.

5           ;Turn on forward timer, if so enabled
            cmp    X25_Timer_Status,X25_Timer_OFF_Implemented
            jne    #ppp_timer_status
            mov    X25_Timer_Status,X25_Timer_ON
        #ppp_timer_status:

10          ;;;;;;;;;;;;;;;;;;
            ;; PARITY CHECK ;;
            ;;;;;;;;;;;;;;;;;;

call   check_parity
            jc     #parity_error            ;chk parity error strip 15          ;;;;;;;;;;;;;;;;;;;;;;;;;;;;;;;;;;;;;;;;;;;;;;;;;;;;;;;;;;;;
            ;; END OF FRAME?                                         ;;
            ;;                                                       ;;
            ;; if (char == PPP_FLAG)       /* end of frame */        ;;
            ;;      if (pppslip_rx_esc_rcvd)                         ;;
20          ;;           //Frame abort: This implementation          ;;
            ;;           //kills the frame without informing         ;;
            ;;           //the upper layer.                          ;;
            ;;           clear out data                              ;;
            ;;           reset frame variables                       ;;
25          ;;           return                                      ;;
            ;;      if (empty frame)  // eg. <PPP_FLAG> <PPP_FLAG>   ;;
            ;;           reset frame variables                       ;;
            ;;           return                                      ;;
            ;;                                                       ;;
30          ;;      remove last 2 chars in RC buffer, they are FCS   ;;
            ;;      if FCS is OK                                     ;;
            ;;           tx_state |= Recv_End_of_Data_Msg            ;;
            ;;      else                                             ;;
            ;;           tx_state |= FCS_Error                       ;;
35          ;;      reset frame variables                            ;;
            ;;      return                                           ;;
            ;;;;;;;;;;;;;;;;;;;;;;;;;;;;;;;;;;;;;;;;;;;;;;;;;;;;;;;;;;;;

cmp    al,PPP_FLAG
```

```
           jne    #char_is_not_ppp_flag        ;jump if not framing char cmp    pppslip_rx_esc_rcvd,0
           jne    #frame_abort                 ;jump if prev char was PPP_ESC cmp    pppslip_rc_char_count,0
 5         je     #ppp_exit_frame_end          ;jump if empty frame ;The last 2 bytes are the FCS, they should be removed
           cmp    pppslip_rc_char_count,2
           js     #ppp_invalid_fcs             ;jump if # chars < min for FCS
           call   remove_rx_char
10         dec    pppslip_rc_char_count
           call   remove_rx_char
           dec    pppslip_rc_char_count IF     PPPSLIP_DEBUG
    ;      jmp    #ppp_valid_fcs
15  ENDIF ;Check received frame's FCS
           cmp    ppp_rx_fcs,CCITT16_GOODCRC
           je     #ppp_valid_fcs               ;frame is good, ship it
           jmp    #ppp_invalid_fcs             ;frame is bad 20  #char_is_not_ppp_flag:

;;;;;;;;;;;;;;;;;;;;;;;;;;;;;;;;;;;;;;;;;;;;;;;;;;;;;;;;;;;;
    ;; TRANSLATE INCOMING CHAR                              ;;
    ;;                                                       ;;
    ;; if (pppslip_rx_esc_rcvd) /* prev char == PPP_ESC */   ;;
25  ;;     pppslip_rx_esc_rcvd = 0;                          ;;
    ;;     char ^= 20h                                       ;;
    ;; else if (char < 20h)      /* and prev char != PPP_ESC */  ;;
    ;;     if (char is flagged in inbound accm table)        ;;
    ;;         return    /* discard, prev char != PPP_ESC */ ;;
30  ;; else if (char == PPP_ESC)                             ;;
    ;;     pppslip_rx_esc_rcvd = !0;                         ;;
    ;;     return        /* don't store nor increment */     ;;
    ;; else if (char == DELETE) /* and prev char != PPP_ESC */  ;;
    ;;     if (inbound delete char translation is enabled)   ;;
35  ;;         return    /* discard, prev char != PPP_ESC */ ;;
    ;; /*else put char into buffer unaltered*/               ;;
    ;;;;;;;;;;;;;;;;;;;;;;;;;;;;;;;;;;;;;;;;;;;;;;;;;;;;;;;;;;;;
```

```
        cmp     pppslip_rx_esc_rcvd,0
        jne     #ppp_esc_rcvd           ;jump if previous char was PPP_ESC test    al,0E0h                 ;accm size, 32 bytes
        jz      #ppp_rx_accm_check      ;jump if char < 20h 5      cmp     al,PPP_ESC
        je      #ppp_esc_char           ;jump if char = = PPP_ESC cmp     al,ASCII_DELETE
        jne     #ppp_rx_translation_done ;just an everyday ordinary type of character is_ascii_delete:
10      cmp     ppp_rx_delete_transl,0
        je      #ppp_rx_translation_done ;jump if DELETE is not to be translated jmp     #ppp_exit_no_save       ;discard char ppp_esc_rcvd:                      ;prev char was ppp_esc
        mov     pppslip_rx_esc_rcvd,0
15      xor     al,20h
        jmp     #ppp_rx_translation_done ppp_rx_accm_check:
        mov     bx,offset ppp_rx_accm

;al is < 20h, use as index into table
20      xlat    [bx]                    ;al gets byte from pre-defined table
        test    al,20h                  ;is bit set?
        jz      #ppp_rx_translation_done ;jump if char is not flagged jmp     #ppp_exit_no_save       ;discard char ppp_esc_char:
25      mov     pppslip_rx_esc_rcvd,1
    #ppp_exit_no_save:
        pop     ds
        ret ppp_rx_translation_done:

30      ;;;;;;;;;;;;;;;;;;;;;;;;;;;;;;;;;;;;;;;;;;;;;;;;;;;;;;;;;;;;
```

```
;; FRAME CHECK SEQUENCE                                          ;;
;;                                       ;;
;; Keep running total of FCS, including final FCS chars.   ;;
;; If the PPP_FLAG is received, ppp_rx_fcs should be F0B8. ;;
;; AL=data,DX=Initial CRC Value; Upon Return: DX=CRC16            ;;
;;;;;;;;;;;;;;;;;;;;;;;;;;;;;;;;;;;;;;;;;;;;;;;;;

mov     dx,ppp_rx_fcs           ;al has data byte
        call    ppp_generate_crc        ;call generate_crc16
        mov     ppp_rx_fcs,dx ;;;;;;;;;;;;;;;;;;;;;;;;;;;;;;;;;;;;
;; INCREMENT COUNTER, STORE CHAR, EXIT ;;
;;                                       ;;
;; if (++pppslip_rc_char_count > mtu)   ;;
;;      set error status                 ;;
;;      return                           ;;
;; else                                  ;;
;;      store char                       ;;
;;;;;;;;;;;;;;;;;;;;;;;;;;;;;;;;;;;;

inc     pppslip_rc_char_count
        mov     bx,pppslip_mtu cmp     bx,pppslip_rc_char_count
        js      #ppp_too_many_chars     ;jump if frame size is too big ;;put char into RC buffer
        call    store_rx_char           ;char is already in register al
        pop     ds
        ret ;;;;;;;;;;;;;;;;;;;;;;;;;;;;;;;;;;;;
;; END OF FRAME & ERROR CONDITIONS ;;
;;;;;;;;;;;;;;;;;;;;;;;;;;;;;;;;;;;;

;This is end of frame, dispatch data to API
#ppp_valid_fcs:
        mov     event_occurred,PAP_RS_COD_END_OF_DATA
;Recv_End_of_Data_Msg
        call    load_allocation_buffer
```

38

```
           jc      #frame_abort            ;if pBus full, kill this PPP frame ppp_this_frame_is_over:
           test    X25_Timer_Status,X25_Timer_ON
           jz      #ppp_aint_no_forward_timer
5          mov     X25_Timer_Status,X25_Timer_OFF_Implemented
    #ppp_aint_no_forward_timer:
           and     tx_state1,not Recv_forward_timeout_reached
           and     tx_state1,not Recv_Interchar_timeout_reached ppp_exit_frame_end:
10         call    ppp_slip_rx_frame_init  ;reset variables for next frame
           pop     ds
           ret ;This is end of frame, no API error, trash data
    #frame_abort:
15         ;clear out RC buffer
           push    si
           mov     si,ss:r_load_ptr
           mov     ss:r_store_ptr,si
           pop     si
20         mov     buf_cur_allocated,0     ;forget about overflowed data
           jmp     #ppp_this_frame_is_over ;This is end of frame, issue API error, trash data
    #ppp_invalid_fcs:
           or      tx_state1,(Report_Recv_BCC_Error_Msg)
25         or      ss:packet_processing,active ;this activates tx_reply_state
           ;mov    buf_cur_allocated,0     ;forget about overflowed data
           jmp     #frame_abort            ;#ppp_this_frame_is_over ;This could be middle of frame, issue API error, trash data ppp_too_many_chars:
30         mov     application_rx_state,offset ppp_rx_appl_start
           or      tx_state1,(Recv_Data_Exceeded_MTU)
           or      ss:packet_processing,active ;this activates tx_reply_state
           ;mov    buf_cur_allocated,0     ;forget about overflowed data
           jmp     #frame_abort            ;#ppp_this_frame_is_over
```

39

```
;This could be middle of frame, issue API error, trash data
#parity_error:
        mov     application_rx_state,offset ppp_rx_appl_start
        or      tx_state1,(Recv_Data_Parity_Error_Msg)
        or      ss:packet_processing,active  ;this activates tx_reply_state
        ;mov    buf_cur_allocated,0          ;forget about overflowed data
        jmp     #frame_abort                 ;#ppp_this_frame_is_over ppp_rx_appl             endp
```

40

PPPTX.S
;*********************************************************************
;*      ppp_transmit_tx_data                                         *
;*                                                                    *
;*      When raw data for one PPP frame is ready, routine ctrlw_data  *
;*      puts this routine's address into tx_data_state. The state     *
;*      machine then executes this routine.                           *
;*                                                                    *
;*      This routine starts a PPP frame transmission to the remote    *
;*      modem with a PPP_FLAG char. It then uses pb_input_vector to   *
;*      do async char mapping on the data byte by byte, which if online *
;*      will eventually call ppp_tx_appl. It then appends the FCS     *
;*      and another PPP_FLAG to the end of the frame.                 *
;*      PPP_tx_appl keeps track of the total size of the frame,       *
;*      excluding PPP_ESC map chars. PPP_tx_appl keeps track of the   *
;*      current FCS.                                                  *
;*                                                                    *
;*      This routine is based on routine transmit_tx_data. It will    *
;*      transmit 20h chars at a time, then release control to give    *
;*      some processing time to the data pump, then rely on the state *
;*      machine to come back to PPP_Transmit_tx_Data_translate to do  *
;*      an additional 20h chars. The carry bit is set on each return. *
;*                                                                    *
;*********************************************************************

Public Ppp_transmit_tx_data
ppp_transmit_tx_data            proc    near

;Initialize frame variables
        mov     pppslip_tx_char_count,0     ;number of chars transmitted
        mov     pppslip_tx_frame_maxed,0    ;frame size overflow indicator
        mov     ppp_tx_fcs,CCITT16_INITFCS  ;initial FCS value mov     al,PPP_FLAG         ;7Eh
        call    store_tx_char       ;write directly to TC buffer, bypassing filters mov     Tx_data_state,offset PPP_Transmit_tx_Data_translate PPP_Transmit_tx_Data_translate:
        push    si
        mov     cx,0
ppp_check_for_more_data:
        mov     si,L_Load_Ptr

41

```
                cmp     si,L_store_Ptr
                jne     #ppp_move_tx_data       ;jump if Gateway pkt has data ;All the data has been sent, now send the FCS thru the translator
                mov     ax,ppp_tx_fcs           ;al = low byte
5               xor     ax,0FFFFh               ;This results in FCS of F0B8,
                                                ;otherwise it would be 0000.
                push    ax                      ;ppp_tx_appl will trash ppp_tx_fcs
                call    pb_input_vector         ;want translation, if needed
                pop     ax
10              xchg    al,ah                   ;al = high byte
                call    pb_input_vector         ;want translation, if needed ;End of frame
                mov     al,PPP_FLAG             ;7Eh
                call    store_tx_char           ;write directly to TC buffer, bypass filters 15              ;Check if MTU was exceeded
                cmp     pppslip_tx_frame_maxed,0 ;is the frame size too big?
                jz      #past_the_frame_error ;ERROR: frame size too big. Data up to max frame size has been xmitted.

inc     pppslip_tx_exceeded_mtu_count
20              jmp     #prep_for_landing past_the_frame_error:
                inc     pppslip_tx_frame_count   ;another valid frame prep_for_landing:
                mov     Tx_data_state,OFFSET Transmit_Idle_State
25              test    msg_type,config_at_data
                jz      #ppp_actual_data
                xor     msg_type,config_at_data
        #ppp_actual_data:
                mov     ax,Nwbus_Frame_Ptr       ;address of buffer to deallocate
30              call    _Deallocate_Rx_Buffer
                call    pb_rx_done
                mov     a_data_frame,0           ;reset
                pop     si
                stc
35              ret
```

42

```
#ppp_move_tx_data:
        mov    bx,ss:t_store_ptr
        sub    bx,ss:t_load_ptr
        jns    #ppp_tmd_over
        add    bx,tc_buflen
#ppp_tmd_over:
        cmp    bx,tc_buflen-10      ;check if too many bytes for buffer
        jae    #ppp_tmd_ret mov    al,[si]              ;get data byte
        push   si
        push   cx call   PB_input_vector      ;put byte onto TC buffer
        pop    cx
        pop    si
        inc    si
        mov    L_Load_Ptr,si        ;update pointer
        inc    cx
        cmp    cx,20h               ;data pump may need processor
        jle    #ppp_check_for_more_data
#ppp_tmd_ret:
        pop    si
        stc
        ret
ppp_transmit_tx_data          endp
```

```
;**********************************************************************
;*      ppp_tx_appl                                          *
;*                                                           *
;*      PPP_Transmit_tx_data eventually calls the function whose  *
;*      address is stored at application_tx_state. Instead of the *
;*      address of routine x_25_tx_appl, application_tx_state is setup *
;*      with this routine's address. X_25_tx_appl ignores, strips, or  *
;*      appends control chars, then assumes the message terminates. *
;*      This routine replaces then appends certain characters, and it *
;*      does not assume that such characters terminate the message. *
;*                                                           *
;*      This routine examines one byte of data (in register AL) and *
;*      puts that byte (or PPP_ESC & translation) into TC buffer.  *
;*      It keeps track of the pre-translation frame size and limits *
```

```
;*      it to the MTU size. It computes the FCS, assuming it was      *
;*      was previously initialized. It does the following translation: *
;*      <PPP_FLAG>  =>  <PPP_ESC> <PPP_FLAG ^ 20h>                    *
;*      <PPP_ESC>   =>  <PPP_ESC> <PPP_ESC ^ 20h>                     *
;*      <(char<20h) && (flagged in accm)>  =>  <PPP_ESC> <char ^ 20h> *
;*                                                                    *
;******************************************************************** ppp_tx_appl         proc    near
              push    ds
              push    NUBUS_RAM
              pop     ds ;increment counter, if not over the mtu limit
              mov     bx,pppslip_tx_char_count
              cmp     bx,pppslip_mtu
              jns     #ppp_tx_max_frame_exceeded  ;jump if maxed out
              inc     bx
              mov     pppslip_tx_char_count,bx    ;update counter ;update FCS with this char
              ;AL=data,DX=Initial CRC Value; Upon Return: DX=CRC16
              mov     dx,ppp_tx_fcs              ;al has data byte
              call    ppp_generate_crc    ;call generate_crc16
              mov     ppp_tx_fcs,dx test    al,0E0h                    ;accm size, 32 bytes
              jz      #ppp_tx_accm cmp     al,PPP_ESC          ;check for translatable chars
              je      #ppp_tx_translate_esc cmp     al,PPP_FLAG
              je      #ppp_tx_translate_flag cmp     al,ASCII_DELETE
              je      #ppp_tx_transl_delete ppp_tx_al_char:
              call    store_tx_char              ;current char is in al
        #ppp_tx_appl_finish:
              pop     ds
```

44

```
                ret ppp_tx_max_frame_exceeded:
                mov     pppslip_tx_frame_maxed,1    ;nonzero if overflow
                jmp     #ppp_tx_appl_finish 5       #ppp_tx_accm:
                mov     bx,offset ppp_tx_accm ;al is < 20h, use as index into table
                xlat    [bx]                ;al gets byte from pre-defined table
                test    al,20h              ;is bit set?
10              jz      #ppp_tx_al_char     ;jump if char is not flagged jmp     #ppp_tx_translate   ;al has translated char ppp_tx_transl_delete:
                cmp     ppp_tx_delete_transl,0
                je      #ppp_tx_al_char     ;jump if DELETE is not to be translated 15              xor     al,20h              ;translate DELETE
                jmp     #ppp_tx_translate   ;al has translated char ppp_tx_translate_esc:
                mov     al,PPP_ESC_EXOR_20H
                jmp     #ppp_tx_translate   ;al has translated char 20      #ppp_tx_translate_flag:
                mov     al,PPP_FLAG_EXOR_20H
                ;;jmp   #ppp_tx_translate   ;al has translated char ppp_tx_translate:
                push    ax                  ;save translated char
25              mov     al,PPP_ESC
                call    store_tx_char               ;xmit 1st char, ie. PPP_ESC
                pop     ax                  ;get 2nd char to xmit
                call    store_tx_char               ;xmit 2nd char
                pop     ds
30              ret
        ppp_tx_appl             endp
```

SLIPRX.S
```
;*********************************************************************
;*      slip_rx_appl_start                                           *
;*                                                                    *
;*      This routine's address is put into application_rx_state when *
;*      all chars are to be ignored except for the SLIP_END char, which *
;*      indicates the start of a new SLIP frame. This routine is called *
;*      with each incoming byte, in register AL.                      *
;*                                                                    *
;*      When the first SLIP_END char is received, application_rx_state *
;*      gets slip_rx_appl's address. Slip_rx_appl will then be called *
;*      for each byte instead of this routine. Slip_rx_appl cannot   *
;*      handle the first SLIP_END char because it assumes that when  *
;*      it receives a SLIP_END char, everything before it was a frame, *
;*      ie. if the data is: <garbage> <SLIP_END> <data> <SLIP_END> ... *
;*      <garbage> would be interpreted as a frame.                   *
;*                                                                    *
;*********************************************************************

Public Slip_rx_appl_start
slip_rx_appl_start      proc    near
        push    ds
        push    NUBUS_RAM
        pop     ds call    chk_rx_timer            ;reset interchar timer
        cmp     al,SLIP_END
        jne     #sras_exit              ;jump if not the starting frame char ;This is start of the first SLIP frame, discard framing char.
        call    ppp_slip_rx_frame_init  ;reset variables for next frame ;Now call slip_rx_appl, not slip_rx_appl_start, when a char comes in
        mov     application_rx_state,offset slip_rx_appl ;Set up timers
        call    chk_rx_timer            ;reset interchar timer
        cmp     X25_Timer_Status,X25_Timer_OFF_Implemented
        jne     #sras_exit
        mov     X25_Timer_Status,X25_Timer_ON sras_exit:
        pop     ds
```

46

```
                ret
slip_rx_appl_start          endp

;****************************************************************
;*      slip_rx_appl                                             *
;*                                                               *
;*      This routine's address is stored at application_rx_state,*
;*      which is called for each incoming byte (it is similar to *
;*      routine x_25_rx_appl).                                   *
;*                                                               *
;*      This routine checks one byte of incoming data. That byte is *
;*      in register AL. It checks for SLIP_END, SLIP_ESC, invalid *
;*      frame size, and if the rest of the frame should be ignored *
;*      because the forward timer expired. When appropriate, the *
;*      incoming char is put into the RC buffer using routine    *
;*      store_rx_char. The maximum frame size includes translational *
;*      chars.                                                   *
;*                                                               *
;*      The translation done here is:                            *
;*              <SLIP_ESC> <SLIP_ESC_END> => <SLIP_END>          *
;*              <SLIP_ESC> <SLIP_ESC_ESC> => <SLIP_ESC>          *
;*              <SLIP_ESC> <x>            => <x>                 *
;*                                                               *
;**************************************************************** slip_rx_appl            proc    near
        push    ds
        push    NUBUS_RAM
        pop     ds

;;;;;;;;;;;;;;;;;;;;
;; CHECK TIMERS    ;;
;;;;;;;;;;;;;;;;;;;;

call    chk_rx_timer    ;reset interchar timer

;;The PPP/SLIP forward timer implementation requirement is that
;;when the forward timer expires before the end of frame char,
;;what has already been received is forwarded to the Gateway and
;;all subsequent chars upto the end of frame char are discarded.
```

```
                ;Turn on forward timer, if so enabled
                cmp    X25_Timer_Status,X25_Timer_OFF_Implemented
                jne    #slip_timer_status
                mov    X25_Timer_Status,X25_Timer_ON
        #slip_timer_status:

;;;;;;;;;;;;;;;;;;;;;;;;;;;;;;;;;;;;;;;;;;;;;;;;;
                ;; END OF FRAME?                              ;;
                ;;                                            ;;
                ;; if (char == SLIP_END)                      ;;
                ;;     if (buffer is not empty)               ;;
                ;;         tx_state |= Recv_End_of_Data_Msg ;;
                ;;     return                                 ;;
                ;;;;;;;;;;;;;;;;;;;;;;;;;;;;;;;;;;;;;;;;;;;;;;;;;

cmp    al,SLIP_END
                je     #char_is_slip_end            ;jump if framing char ;;;;;;;;;;;;;;;;;;;;;;;;;;;;;;;;;;;;;;;;
                ;; INCREMENT COUNTER, CHECK MTU      ;;
                ;;                                   ;;
                ;; if (++slip_rx_frame_count > mtu) ;;
                ;;     set error status              ;;
                ;;     ret                           ;;
                ;;;;;;;;;;;;;;;;;;;;;;;;;;;;;;;;;;;;;;;

push   ax inc    slip_rx_frame_count
                mov    ax,slip_rx_frame_count cmp    pppslip_mtu,ax
                js     #slip_too_many_chars         ;jump if frame size is not OK slip_size_is_ok:
                pop    ax

;;;;;;;;;;;;;;;;;;;;;;;;;;;;;;;;;;;;;;;;;;
                ;; TRANSLATE & STORE ESCAPED CHAR      ;;
                ;;                                     ;;
                ;; if (pppslip_rx_esc_rcvd)            ;;
                ;;     pppslip_rx_esc_rcvd = 0;        ;;
                ;;                                     ;;
                ;;     if (char == SLIP_ESC_END)       ;;
```

```
;;              mov     al,SLIP_END        ;;
;;           else if (char = = SLIP_ESC_ESC)      ;;
;;              mov     al,SLIP_ESC        ;;
;;           /* else protocol violation,   */ ;;
;;           /*    do what RFC1055 does, */ ;;
;;           /*    stuff it in anyway    */ ;;
;;                                           ;;
;;           store char                      ;;
;;           return                          ;;
;;;;;;;;;;;;;;;;;;;;;;;;;;;;;;;;;;;;;;;;;;;;;;

cmp     pppslip_rx_esc_rcvd,0
        je      #prev_char_not_slip_esc    ;jump if previous char was not SLIP_ESC mov     pppslip_rx_esc_rcvd,0
        cmp     al,SLIP_ESC_END
        jne     #slip_esc_esc_test mov     al,SLIP_END                ;replacement char
        jmp     #slip_rx_store_char slip_esc_esc_test:
        cmp     al,SLIP_ESC_ESC
        jne     #slip_rx_store_char
        mov     al,SLIP_ESC                ;replacement char
        jmp     #slip_rx_store_char prev_char_not_slip_esc:

;;;;;;;;;;;;;;;;;;;;;;;;;;;;;;;;;;;
;; CHECK FOR ESCAPE, ELSE STORE            ;;
;;                                  ;;
;; if (char = = SLIP_ESC)  ;;
;;      pppslip_rx_esc_rcvd = 1; ;;
;;      return                    ;;
;; else                            ;;
;;      store char                 ;;
;;      return                     ;;
;;;;;;;;;;;;;;;;;;;;;;;;;;;;;;;;;;;;

cmp     al,SLIP_ESC
        je      #slip_esc_received slip_rx_store_char:
```

```
                inc    pppslip_rc_char_count
                call   store_rx_char          ;char is already in register al
                pop    ds
                ret 5       #slip_esc_received:
                mov    pppslip_rx_esc_rcvd,1
                pop    ds
                ret ;;;;;;;;;;;;;;;;;;;;;;;;;;;;;;;;;;;;
10      ;; END OF FRAME & ERROR CONDITIONS ;;
        ;;;;;;;;;;;;;;;;;;;;;;;;;;;;;;;;;;;;

;This is end of frame, dispatch data to API
        #char_is_slip_end:
                cmp    pppslip_rc_char_count,0
15              je     #slip_exit_frame_end    ;jump if empty frame mov    event_occurred,PAP_RS_COD_END_OF_DATA
        ;Recv_End_of_Data_Msg
                call   load_allocation_buffer
                jc     #slip_trash_data    ;if pBus full, kill this PPP frame 20      #slip_this_frame_is_over:
                test   X25_Timer_Status,X25_Timer_ON
                jz     #slip_aint_no_forward_timer
                mov    X25_Timer_Status,X25_Timer_OFF_Implemented
        #slip_aint_no_forward_timer:
25              and    tx_state1,not Recv_forward_timeout_reached
                and    tx_state1,not Recv_Interchar_timeout_reached slip_exit_frame_end:
                call   ppp_slip_rx_frame_init   ;reset variables for next frame
                pop    ds
30              ret ;Throw out data in RC buffer and any that overflowed to pbus
        #slip_trash_data:
                ;clear out RC buffer
```

50

```
        push    si
        mov     si,ss:r_load_ptr
        mov     ss:r_store_ptr,si
        pop     si
        mov     buf_cur_allocated,0         ;forget about overflowed data
        jmp     #slip_this_frame_is_over ;This could be middle of frame, issue API error, trash data slip_too_many_chars:
        pop     ax
        mov     application_rx_state,offset slip_rx_appl_start mov     application_rx_state,offset slip_rx_appl_start
        or      tx_state1,(Recv_Data_Exceeded_MTU)
        or      ss:packet_processing,active ;this activates tx_reply_state
        ;mov    buf_cur_allocated,0         ;forget about overflowed data
        jmp     #slip_trash_data            ;#slip_this_frame_is_over
slip_rx_appl            endp
```

---

```
SLIPTX.S
;***************************************************************
;*      slip_transmit_tx_data                                  *
;*                                                             *
;*      When raw data for one SLIP frame is ready, routine ctrlw_data *
;*      puts this routine's address into tx_data_state. The state    *
;*      machine then executes this routine.                    *
;*                                                             *
;*      This routine starts a SLIP frame transmission to the remote  *
;*      modem with a SLIP_END char. It then uses pb_input_vector to  *
;*      do async char mapping on the data byte by byte, which if online *
;*      will eventually call slip_tx_appl. It then appends a SLIP_END *
;*      char to the end of the frame. Routine slip_tx_appl will keep  *
;*      track of the total size of the frame, including SLIP_ESC map *
;*      chars if variable pppslip_tx_char_count is initialized here.  *
;*                                                             *
;*      This routine is based on routine transmit_tx_data. It will    *
;*      transmit 20h chars at a time, then release control to give    *
;*      some processing time to the data pump, then rely on the state *
;*      machine to come back to SLIP_Transmit_tx_Data_translate to do *
;*      an additional 20h chars. The carry bit is set on each return. *
```

```
        ;*                                                              *
        ;**************************************************************

Public Slip_transmit_tx_data
        slip_transmit_tx_data         proc    near

5             ;Initialize frame variables
                mov    pppslip_tx_char_count,0        ;number of chars transmitted
                mov    pppslip_tx_frame_maxed,0  ;frame size overflow indicator mov    al,SLIP_END        ;C0h
                call   store_tx_char      ;write directly to TC buffer, bypassing filters 10             mov    Tx_data_state,offset SLIP_Transmit_tx_Data_translate SLIP_Transmit_tx_Data_translate:
                push   si
                mov    cx,0
        #slip_check_for_more_data:
 15             mov    si,L_Load_Ptr
                cmp    si,L_store_Ptr
                jne    #slip_move_tx_data         ;jump if Gateway pkt has data ;End of frame
                mov    al,SLIP_END        ;C0h
 20             call   store_tx_char      ;write directly to TC buffer, bypassing filters ;Check if MTU was exceeded
                cmp    pppslip_tx_frame_maxed,0 ;is the frame size too big?
                jz     #past_the_frame_error ;ERROR: frame size too big. Data up to max frame size has been xmitted.

25             inc    pppslip_tx_exceeded_mtu_count
                jmp    #prep_for_landing past_the_frame_error:
                inc    pppslip_tx_frame_count      ;another valid frame prep_for_landing:
 30             mov    Tx_data_state,OFFSET Transmit_Idle_State
                test   msg_type,config_at_data
                jz     #slip_actual_data
```

52

```
                xor     msg_type,config_at_data
        #slip_actual_data:
                mov     ax,Nwbus_Frame_Ptr      ;address of buffer to deallocate
                call    _Deallocate_Rx_Buffer
 5              call    pb_rx_done
                mov     a_data_frame,0          ;reset
                pop     si
                stc
                ret 10      #slip_move_tx_data:
                mov     bx,ss:t_store_ptr
                sub     bx,ss:t_load_ptr
                jns     #slip_tmd_over
                add     bx,tc_buflen
15      #slip_tmd_over:
                cmp     bx,tc_buflen-10         ;check if too many bytes for buffer
                jae     #slip_tmd_ret mov     al,[si]                 ;get data byte
                push    si
20              push    cx
                call    PB_input_vector         ;put byte onto TC buffer
                pop     cx
                pop     si
                inc     si
25              mov     L_Load_Ptr,si           ;update pointer
                inc     cx
                cmp     cx,20h                  ;data pump may need processor
                jle     #slip_check_for_more_data
        #slip_tmd_ret:
30              pop     si
                stc
                ret
        slip_transmit_tx_data           endp ;************************************************************************
35      ;*      slip_tx_appl                                            *
        ;*                                                              *
        ;*      SLIP_Transmit_tx_data eventually calls the function whose    *
        ;*      address is stored at application_tx_state. Instead of the    *
        ;*      address of routine x_25_tx_appl, application_tx_state is setup *
```

```
;*    with this routine's address. X_25_tx_appl ignores, strips, or        *
;*    appends control chars, then assumes the message terminates.          *
;*    This routine replaces then appends certain characters, and it        *
;*    does not assume that such characters terminate the message.          *
;*                                                                         *
;*    This routine examines one byte of data (in register AL) and          *
;*    puts that byte (or SLIP_ESC and translation) into TC buffer.         *
;*    It keeps track of the post-translation frame size and limits         *
;*    it to the MTU size. It does the following translation:               *
;*         <SLIP_END>   =>   <SLIP_ESC> <SLIP_ESC_END>                     *
;*         <SLIP_ESC>   =>   <SLIP_ESC> <SLIP_ESC_ESC>                     *
;*                                                                         *
;************************************************************************* slip_tx_appl            proc    near
        push    ds
        push    NUBUS_RAM
        pop     ds ;increment counter, if not over the mtu limit
        mov     bx,pppslip_tx_char_count
        cmp     bx,pppslip_mtu
        jns     #slip_tx_max_frame_exceeded    ;jump if maxed out
        inc     bx
        mov     pppslip_tx_char_count,bx    ;update counter cmp     al,SLIP_ESC                 ;check for translatable chars
        je      #slip_tx_translate_esc
        cmp     al,SLIP_END
        je      #slip_tx_translate_end call    store_tx_char               ;current char is in al
slip_tx_appl_finish:
        pop     ds
        ret slip_tx_max_frame_exceeded:
        mov     pppslip_tx_frame_maxed,1    ;nonzero if overflow
        jmp     #slip_tx_appl_finish slip_tx_translate_esc:
        push    ax                          ;save original ax value (required?)
        mov     al,SLIP_ESC_ESC
        push    ax                          ;save 2nd char we want xmitted
```

```
            jmp     #slip_tx_translate slip_tx_translate_end:
            push    ax                      ;save original ax value (required?)
            mov     al,SLIP_ESC_END
5           push    ax                      ;save 2nd char we want xmitted slip_tx_translate:
            mov     al,SLIP_ESC
            call    store_tx_char           ;xmit 1st char, ie. SLIP_ESC
            pop     ax                      ;get 2nd char to xmit 10          ;increment counter again, if not over the mtu limit
            cmp     bx,pppslip_mtu
            jns     #slip_tx_translate_finish   ;jump if maxed out
            inc     bx
            mov     pppslip_tx_char_count,bx 15          call    store_tx_char           ;xmit 2nd char
    #slip_tx_translate_finish:
            pop     ax                      ;restore ax
            pop     ds
            ret
20  slip_tx_appl            endp
```

It will be appreciated from the foregoing detailed description that many variations and modifications may be made without departure from the true spirit and scope of the invention. This true spirit and scope is defined by the appended claims, interpreted in light of the forgoing specification.

We claim:

1. In a network access server comprising a plurality of modems, a communication line interface to a communication line and a network gateway connecting said network access server to a network and computer system, said network access server enabling a plurality of remote users to communicate with said computer system over said communication line and network, a method for processing a plurality of calls, including a first call and a second call, occurring substantially simultaneously between said computer system and said plurality of remote users through said network access server that achieves an efficient data throughput, said calls associated with a point-to-point protocol requiring processing by said network access server in order to generate and end-to-end connection in accordance with said point-to-point protocol between said plurality of remote users and said computer system, comprising the steps of:

performing a first portion of the processing of said point-to-point protocol for said first call at a computing platform associated with a first modem in said plurality of modems;

performing a second portion of the processing of said point-to-point protocol for said first call in a computing platform in said network gateway;

performing a first portion of the processing of said point-to-point protocol for said second call at a computing platform associated with a second modem in said plurality of modems; and performing a second portion of the processing of said point-to-point protocol for said second call in a computing platform in said network gateway;

wherein the distributed processing of said first and second portions of said point-to-point protocol between said computing platforms associated with said first and second modems and said network gateway for said first and second calls removes a processing burden on said computing platform in said network gateway, enabling the throughput of said calls through said network access server to be improved.

2. The method of claim 1, wherein said processing of said first portion of said point-to-point protocol performed by said computing platforms associated with said first and second modems comprises the steps of examining a point-to-point protocol frame, translating transparent data in said point-to-point protocol frame if required, and calculating a frame check sequence for said frame of data, and wherein the method further comprises the step of transmitting said point-to-point protocol frame onto said communication line.

3. In a network access server comprising a plurality of modems, a communication line interface to a communication line and a network gateway connecting said network access server to a network and a computer system, said network access server enabling a plurality of remote users to communicate with said computer system over said communication line and network, a method for processing a plurality of calls, including a first call and a second call, occurring substantially simultaneously between said computer system and a plurality of said remote users through said network access server that achieves an efficient data throughput, said calls associated with a serial line interface protocol requiring processing by said network access server in order to generate and end-to-end connection in accordance with said serial line interface protocol between said plurality of remote users and said computer system, comprising the steps of:

performing a first portion of the processing of serial line interface protocol for said first call at a computing platform associated with a first modem in said plurality of modems;

performing a second portion of the processing of said serial line interface protocol for said first call in a computing platform in said network gateway;

performing a first portion of the processing of said serial line interface protocol for said second call at a computing platform associated with a second modem in said plurality of modems; and performing a second portion of the processing of said serial line interface protocol for said second call in a computing platform in said network gateway;

wherein the distributed processing of said first and second portions of said serial line interface protocol between said computing platforms associated with said first and second modems and said network gateway for said first and second calls removes a processing burden on said computing platform in said network gateway, enabling the throughput of said calls through said network access server to be improved.

4. The method off claim 3, wherein said step of performing said first portion of the processing of serial line interface protocol at said computing platform of said modems comprises the step translating transparent data in a serial line interface protocol frame and adding a serial line interface protocol framing character to said serial line interface protocol frame, and wherein the method further comprises the step of transmitting said serial line interface protocol frame onto said communications line.

* * * * *